US012802185B2

(12) United States Patent
Xu et al.

(10) Patent No.: US 12,802,185 B2
(45) Date of Patent: Nov. 17, 2026

(54) TONE MAPPING METHOD AND APPARATUS FOR PANORAMIC IMAGE

(71) Applicant: HUAWEI TECHNOLOGIES CO., LTD., Shenzhen (CN)

(72) Inventors: Weiwei Xu, Hangzhou (CN); Quanhe Yu, Beijing (CN); Hu Chen, Munich (DE); Yichuan Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 258 days.

(21) Appl. No.: 18/411,529

(22) Filed: Jan. 12, 2024

(65) Prior Publication Data

US 2024/0153051 A1 May 9, 2024

Related U.S. Application Data

(63) Continuation of application No. PCT/CN2022/100495, filed on Jun. 22, 2022.

(30) Foreign Application Priority Data

Jul. 14, 2021 (CN) ........................ 202110794014.5

(51) Int. Cl.
*G06T 5/90* (2024.01)
*G06T 3/16* (2024.01)
(Continued)

(52) U.S. Cl.
CPC .................. *G06T 5/90* (2024.01); *G06T 3/16* (2024.01); *G06T 5/50* (2013.01); *G06T 5/92* (2024.01);
(Continued)

(58) Field of Classification Search
CPC .... G06T 5/90; G06T 3/16; G06T 5/50; G06T 5/92; G06T 7/11; G06T 2207/10016;
(Continued)

(56) References Cited

U.S. PATENT DOCUMENTS 6,753,987 B1 * 6/2004 Farnung ................. H04N 1/407 358/518
9,621,767 B1 * 4/2017 El Mezeni ................ G06T 5/92
(Continued)

FOREIGN PATENT DOCUMENTS

CN 106899840 A 6/2017
CN 107230180 A 10/2017
CN 113052923 A 6/2021

OTHER PUBLICATIONS

ITU-R:"Reference electro-optical transfer function for flat panel displays used in HDTV studio production." ITU-R BT.1886. Mar. 2011. total 7 pages.
(Continued)

*Primary Examiner* — Michael S Osinski
(74) *Attorney, Agent, or Firm* — WOMBLE BOND DICKINSON (US) LLP

(57) ABSTRACT

This application provides a tone mapping method and apparatus for a panoramic image. The tone mapping method includes: determining one or more target metadata information units of a first pixel from a plurality of metadata information units, where the plurality of metadata information units are obtained by parsing a bitstream, the first pixel is any pixel in a to-be-processed panoramic video two-dimensional planar projection, the plurality of metadata information units correspond to a plurality of segmented regions included in a panoramic video three-dimensional spherical representation panoramic image, and there is a mapping relationship between the panoramic video two-dimensional planar projection and the panoramic video three-dimensional spherical representation panoramic image; and performing tone mapping on a pixel value of the
(Continued)

first pixel based on the one or more target metadata information units, to obtain a target tone mapping value of the first pixel.

20 Claims, 13 Drawing Sheets

(51) Int. Cl.
*G06T 5/50* (2006.01)
*G06T 5/92* (2024.01)
*G06T 7/11* (2017.01)

(52) U.S. Cl.
CPC ...... *G06T 7/11* (2017.01); *G06T 2207/10016* (2013.01); *G06T 2207/20208* (2013.01)

(58) Field of Classification Search
CPC ............. G06T 2207/20208; G06T 7/90; G06T 3/4038; G06T 3/12; G06T 15/205; G06T 2207/10024; G06T 2207/10028; G06T 2207/20221; G06T 3/047; H04N 23/698; H04N 19/597; H04N 13/243; H04N 19/176; H04N 23/90; H04N 19/117; H04N 19/174; H04N 19/86; H04N 23/45; H04N 13/106; H04N 13/111; H04N 19/46
See application file for complete search history.

(56) References Cited

U.S. PATENT DOCUMENTS

| | | | | |
|---|---|---|---|---|
| 9,692,965 | B2 * | 6/2017 | Hayashi | H04N 23/698 |
| 10,715,783 | B1 * | 7/2020 | Joshi | G06T 15/205 |
| 11,416,965 | B2 * | 8/2022 | Song | G06T 7/74 |
| 11,558,557 | B2 * | 1/2023 | Guérin | H04N 23/73 |
| 11,582,510 | B2 * | 2/2023 | Han | H04N 21/44016 |
| 11,790,488 | B2 * | 10/2023 | Newman | G06T 3/00 375/240.26 |
| 11,843,863 | B2 * | 12/2023 | Song | G06T 5/92 |
| 11,887,210 | B2 * | 1/2024 | MacDonald | G06T 5/50 |
| 12,075,166 | B2 * | 8/2024 | Song | G06T 3/40 |
| 12,085,650 | B2 * | 9/2024 | Li | G06T 7/13 |
| 12,108,081 | B2 * | 10/2024 | Newman | H04N 19/597 |
| 12,132,995 | B2 * | 10/2024 | Dou | H04N 23/698 |
| 12,388,964 | B2 * | 8/2025 | Xu | G06T 5/92 |
| 2005/0104900 | A1 * | 5/2005 | Toyama | G06T 5/90 345/605 |
| 2010/0315215 | A1 * | 12/2010 | Yuda | H04N 23/58 340/435 |
| 2011/0157305 | A1 * | 6/2011 | Kosakai | H04N 13/156 348/43 |
| 2014/0176542 | A1 * | 6/2014 | Shohara | G06T 17/00 345/420 |
| 2016/0292834 | A1 * | 10/2016 | Tsuru | G06T 5/92 |
| 2017/0076429 | A1 * | 3/2017 | Russell | G06T 15/04 |
| 2017/0127045 | A1 * | 5/2017 | Lin | H04N 23/698 |
| 2017/0134713 | A1 * | 5/2017 | Lin | H04N 13/246 |
| 2017/0256039 | A1 * | 9/2017 | Hsu | G06T 5/92 |
| 2018/0114505 | A1 * | 4/2018 | Heywood-Lonsdale | G09G 3/3611 |
| 2018/0268517 | A1 * | 9/2018 | Coban | G06T 15/205 |
| 2018/0276800 | A1 * | 9/2018 | Abbas | G06T 5/92 |
| 2018/0276826 | A1 * | 9/2018 | Van Der Auwera | G02B 27/017 |
| 2018/0322611 | A1 * | 11/2018 | Bang | G06T 3/12 |
| 2018/0350047 | A1 * | 12/2018 | Baar | G06T 5/92 |
| 2018/0374192 | A1 | 12/2018 | Kunkel et al. | |
| 2019/0057487 | A1 * | 2/2019 | Cheng | H04N 13/161 |
| 2019/0104326 | A1 * | 4/2019 | Stockhammer | H04L 65/65 |
| 2019/0273929 | A1 * | 9/2019 | Ma | H04N 19/176 |
| 2019/0297342 | A1 * | 9/2019 | Ma | H04N 19/61 |
| 2020/0053393 | A1 * | 2/2020 | Niamut | H04N 19/597 |
| 2020/0177916 | A1 * | 6/2020 | Niamut | H04N 19/46 |
| 2020/0267385 | A1 * | 8/2020 | Lim | H04N 19/117 |
| 2020/0412928 | A1 * | 12/2020 | Hohjoh | H04N 23/10 |
| 2020/0412948 | A1 * | 12/2020 | Hohjoh | H04N 23/698 |
| 2022/0163346 | A1 * | 5/2022 | Han | G06V 20/588 |
| 2024/0163549 | A1 * | 5/2024 | Shimizu | G01S 17/36 |
| 2024/0331117 | A1 * | 10/2024 | Xu | G06T 3/06 |

OTHER PUBLICATIONS

SMPTE Standard:"Dynamic Metadata for Color Volume Transform—Core Components." May 18, 2016. total 15 pages.

* cited by examiner

TONE MAPPING METHOD AND APPARATUS FOR PANORAMIC IMAGE

CROSS-REFERENCE TO RELATED APPLICATIONS

This application is a continuation of International Application No. PCT/CN2022/100495, filed on Jun. 22, 2022, which claims priority to Chinese Patent Application No. 202110794014.5, filed on Jul. 14, 2021. The disclosures of the aforementioned applications are hereby incorporated by reference in their entireties.

TECHNICAL FIELD

This application relates to the image processing field, and in particular, to a tone mapping method and apparatus for a panoramic image.

BACKGROUND

A dynamic range indicates a ratio between a maximum value and a minimum value of a variable in many fields. In a digital image, the dynamic range indicates a ratio between a maximum grayscale value and a minimum grayscale value in an image displayable range. In a same scene of a real world, a dynamic range in the real world is usually between $10^{-3}$ candela per square meter (cd/$m^2$) and $10^6$ cd/$m^2$, and is referred to as a high dynamic range (HDR). Currently, in a large quantity of color digital images, 0 to 255 are a dynamic range of the image, and are referred to as a low dynamic range (LDR).

Because there is a difference between a luminance range of a display device and the dynamic range of the real world, the dynamic range of the real world needs to be mapped onto the luminance range of the display device, which is referred to as dynamic-range mapping. Dynamic-range mapping may be applied to adaptation between an HDR signal of a front end and an HDR display device of a display end. For example, the front end collects a luminance signal at 4000 cd/$m^2$, and an HDR display capability of the HDR display device of the display end is 500 cd/$m^2$. Mapping the luminance signal at 4000 cd/$m^2$ onto the display device whose HDR display capability is 500 cd/$m^2$ is a high-to-low tone mapping (TM) process. Dynamic-range mapping may be further applied to adaptation between an SDR signal of the front end and the HDR display device of the display end. For example, the front end collects a luminance signal at 100 cd/$m^2$, and the HDR display capability of the HDR display device of the display end is 2000 cd/$m^2$. Mapping the luminance signal at 100 cd/$m^2$ onto the display device whose HDR display capability is 2000 cd/$m^2$ is a low-to-high TM process.

Currently, there may be two dynamic-range mapping methods: a static mapping method and a dynamic mapping method. In the static mapping method, a single piece of data is used to perform an entire TM process based on same video content or same hard disk content. In other words, there is usually a same mapping curve for various scenes. The method has advantages that an image needs to carry less data and a processing procedure is simple, but has a disadvantage that information may be lost in some scenes because the same mapping curve is used for TM in all scenes. For example, if the mapping curve focuses on protecting a bright region, some details may be lost or even invisible in some extremely dark scenes. Consequently, image display effect is affected. According to the dynamic mapping method, a mapping curve is dynamically adjusted for each scene or each frame of content based on an region. This method has an advantage that differentiated processing can be implemented for different scenes or frames, but has a disadvantage that an image needs to carry a large amount of data because related scene information needs to be carried in each frame or scene.

However, neither of the foregoing methods is compatible with dynamic-range mapping of a panoramic video.

SUMMARY

This application provides a tone mapping method and apparatus for a panoramic image, to improve panoramic image processing efficiency.

According to a first aspect, this application provides a tone mapping method for a panoramic image, including: determining one or more target metadata information units of a first pixel from a plurality of metadata information units, where the plurality of metadata information units are obtained by parsing a bitstream, the first pixel is any pixel in a to-be-processed panoramic video two-dimensional planar projection, the plurality of metadata information units correspond to a plurality of segmented regions included in a panoramic video three-dimensional spherical representation panoramic image, and there is a mapping relationship between the panoramic video two-dimensional planar projection and the panoramic video three-dimensional spherical representation panoramic image; and performing tone mapping on a pixel value of the first pixel based on the one or more target metadata information units, to obtain a target tone mapping value of the first pixel.

In this application, a panoramic video three-dimensional spherical representation panoramic image corresponding to the panoramic image is segmented into a plurality of segmented regions, and a metadata information unit of the segmented region is generated based on a pixel corresponding to a mapping point included in each segmented region, so that the metadata information unit is used to guide a display end to generate a tone mapping curve corresponding to the segmented region, to implement tone mapping from the image to displaying. In this way, a matched tone mapping parameter can be determined for different dynamic range regions of the panoramic image, and a display dynamic range of the display end can be met, to improve panoramic image processing efficiency.

In an embodiment, before the determining one or more target metadata information units of a first pixel from a plurality of metadata information units, the method further includes: obtaining the plurality of segmented regions.

In an embodiment, the obtaining the plurality of segmented regions includes: segmenting the panoramic video three-dimensional spherical representation panoramic image in a preset segmentation manner, to obtain the plurality of segmented regions.

In an embodiment, the obtaining the plurality of segmented regions includes: segmenting the panoramic video three-dimensional spherical representation panoramic image in a segmentation manner obtained by parsing the bitstream to obtain the plurality of segmented regions.

In an embodiment, the plurality of segmented regions are obtained by segmenting the panoramic video three-dimensional spherical representation panoramic image based on a preset angle of view separation rule; or the plurality of segmented regions are obtained by segmenting the panoramic video three-dimensional spherical representation panoramic image in a latitude direction; and/or the plurality of segmented regions are obtained by segmenting the panoramic video three-dimensional spherical representation panoramic image in a longitude direction.

In an embodiment, the segmenting the panoramic video three-dimensional spherical representation panoramic image, to obtain the plurality of segmented regions includes: clustering a plurality of pixels included in the panoramic video two-dimensional planar projection, to obtain a plurality of pixel sets; separately mapping the plurality of pixels onto the panoramic video three-dimensional spherical representation panoramic image; and using, as a first segmented region, a region including a mapping point that corresponds to a pixel included in a first pixel set and that is in the panoramic video three-dimensional spherical representation panoramic image, where the first pixel set is one of the plurality of pixel sets, and the first segmented region is one of the plurality of segmented regions.

In an embodiment, the segmenting the panoramic video three-dimensional spherical representation panoramic image, to obtain the plurality of segmented regions includes: separately mapping a plurality of pixels included in the panoramic video two-dimensional planar projection onto the panoramic video three-dimensional spherical representation panoramic image, to obtain a plurality of mapping points; clustering the plurality of mapping points, to obtain a plurality of mapping point sets; and using, as a second segmented region, a region including a mapping point included in a first mapping point set, where the first mapping point set is one of the plurality of mapping point sets, and the second segmented region is one of the plurality of segmented regions.

In an embodiment, the obtaining the plurality of segmented regions includes: obtaining the plurality of segmented regions based on indication information of the plurality of segmented regions obtained by parsing the bitstream.

In this application, the panoramic video three-dimensional spherical representation panoramic image may be segmented in one of the foregoing plurality of segmentation methods, to obtain the plurality of segmented regions. This may be applied to a pixel distribution of the panoramic video two-dimensional planar projection, so that tone mapping can be in a unit of a segmented region, and tone mapping can be implemented in a small dynamic range, to improve tone mapping efficiency.

In an embodiment, the determining one or more target metadata information units of a first pixel from a plurality of metadata information units includes: determining a correspondence between the plurality of metadata information units and the plurality of segmented regions, where one metadata information unit corresponds to one or more segmented regions; determining one or more target segmented regions based on a specified mapping point; and when there is only one target segmented region, determining a metadata information unit corresponding to the one target segmented region as the one target metadata information unit; or when there are a plurality of target segmented regions, determining metadata information units respectively corresponding to the plurality of target segmented regions as a plurality of target metadata information units.

In an embodiment, the determining a correspondence between the plurality of metadata information units and the plurality of segmented regions includes: extracting a current metadata information unit from the plurality of metadata information units in a first preset sequence; extracting a current segmented region from the plurality of segmented regions in a second preset sequence; and establishing a correspondence between the current segmented region and the current metadata information unit.

In an embodiment, the determining a correspondence between the plurality of metadata information units and the plurality of segmented regions includes: extracting a current metadata information unit from the plurality of metadata information units in a first preset sequence; extracting a current segmented region from the plurality of segmented regions in a traversing sequence obtained by parsing the bitstream; and establishing a correspondence between the current segmented region and the current metadata information unit.

In an embodiment, the determining a correspondence between the plurality of metadata information units and the plurality of segmented regions includes: extracting a current metadata information unit from the plurality of metadata information units in a first preset sequence; obtaining one or more coordinates included in the current metadata information unit; determining one or more mapping points in the panoramic video three-dimensional spherical representation panoramic image based on the one or more coordinates; and when there is only one mapping point, establishing a correspondence between the current metadata information unit and a segmented region to which the one mapping point belongs; or when there are a plurality of mapping points, establishing a correspondence between the current metadata information unit and at least one segmented region to which the plurality of mapping points belong.

In this application, the correspondence between the plurality of segmented regions and the plurality of metadata information units is determined in one of the foregoing plurality of correspondence obtaining methods, and the correspondence does not need to be transmitted to the display end by using the bitstream, to reduce information carried in the bitstream.

In an embodiment, the specified mapping point is a first mapping point of the first pixel in the panoramic video three-dimensional spherical representation panoramic image, and the determining one or more target segmented regions based on a specified mapping point includes: determining a first coverage area in the panoramic video three-dimensional spherical representation panoramic image by using the first mapping point as a center; and when the first coverage area includes one segmented region, determining the one segmented region as one target segmented region; or when the first coverage area includes a plurality of segmented regions, determining the plurality of segmented regions as a plurality of target segmented regions.

In an embodiment, the specified mapping point is a point of view center in the panoramic video three-dimensional spherical representation panoramic image, and the determining one or more target segmented regions based on a specified mapping point includes: determining a second segmented region to which the point of view center belongs, where the plurality of segmented regions include the second segmented region; and determining the second segmented region as one target segmented region.

In an embodiment, the specified mapping point is a point of view center in the panoramic video three-dimensional spherical representation panoramic image, and the determining one or more target segmented regions based on a specified mapping point includes: determining a second coverage area in the panoramic video three-dimensional spherical representation panoramic image by using the point of view center as a center; and when the second coverage area includes one segmented region, determining the one segmented region as one target segmented region; or when the second coverage area includes a plurality of segmented regions, determining the plurality of segmented regions as a plurality of target segmented regions.

In an embodiment, the performing tone mapping on a pixel value of the first pixel based on the one or more target metadata information units, to obtain a target tone mapping value of the first pixel includes: obtaining one or more tone mapping curves based on the one or more target metadata information units; when there is only one tone mapping curve, performing tone mapping on the pixel value of the first pixel based on the one tone mapping curve, to obtain the target tone mapping value; or when there are a plurality of tone mapping curves, separately performing tone mapping on the pixel value of the first pixel based on the plurality of tone mapping curves, to obtain a plurality of tone median values of the first pixel; and obtaining the target tone mapping value based on the plurality of tone median values.

In an embodiment, the obtaining the target tone mapping value based on the plurality of tone median values includes: determining a median value in the plurality of tone median values as the target tone mapping value; or performing weighted averaging on the plurality of tone median values, to obtain the target tone mapping value, where a weighting coefficient of the plurality of tone median values is preset, or a weighting coefficient of the plurality of tone median values is related to a distance between the first pixel and a central point of each segmented region, or a weighting coefficient of the plurality of tone median values is related to area proportions of segmented regions respectively corresponding to the plurality of target metadata information units.

In this application, the target tone mapping value of the first pixel is obtained in one of the foregoing plurality of methods, and a tone mapping curve of the first pixel may be generated with reference to metadata information units of one or more segmented regions, to improve tone mapping accuracy.

According to a second aspect, this application provides a tone mapping method for a panoramic image, including: obtaining at least one mapping point included in a first segmented region, where the first segmented region is one of a plurality of segmented regions included in a panoramic video three-dimensional spherical representation panoramic image, there is a mapping relationship between the panoramic video three-dimensional spherical representation panoramic image and a to-be-processed panoramic video two-dimensional planar projection, and the at least one mapping point corresponds to at least one pixel in the panoramic video two-dimensional planar projection; generating a metadata information unit of the first segmented region based on the at least one pixel; and writing the metadata information unit of the first segmented region into a bitstream.

In this application, a panoramic video three-dimensional spherical representation panoramic image corresponding to the panoramic image is segmented into a plurality of segmented regions, and a metadata information unit of the segmented region is generated based on a pixel corresponding to a mapping point included in each segmented region, so that the metadata information unit is used to guide a display end to generate a tone mapping curve corresponding to the segmented region, to implement tone mapping from the image to displaying. In this way, a matched tone mapping parameter can be determined for different dynamic range regions of the panoramic image, and a display dynamic range of the display end can be met, to improve panoramic image processing efficiency.

In an embodiment, after the generating a metadata information unit of the first segmented region based on the at least one pixel, the method further includes: when histograms and/or luminance of the first segmented region and the second segmented region meet/meets a specified condition, merging a metadata information unit of the first segmented region and a second metadata information unit of the second segmented region, to obtain a metadata information unit of the first segmented region and the second segmented region, where the second segmented region is one of the plurality of segmented regions.

In this application, metadata information units of at least two segmented regions with a small histogram and/or luminance difference are fused, to reduce an amount of data of a metadata information unit carried in the bitstream.

In an embodiment, before the obtaining at least one mapping point included in a first segmented region, the method further includes: mapping the panoramic video two-dimensional planar projection onto the panoramic video three-dimensional spherical representation panoramic image; and segmenting the panoramic video three-dimensional spherical representation panoramic image, to obtain the plurality of segmented regions.

In an embodiment, the segmenting the panoramic video three-dimensional spherical representation panoramic image, to obtain the plurality of segmented regions includes: segmenting the panoramic video three-dimensional spherical representation panoramic image in a preset segmentation manner, to obtain the plurality of segmented regions.

In an embodiment, the segmenting the panoramic video three-dimensional spherical representation panoramic image, to obtain the plurality of segmented regions includes: segmenting the panoramic video three-dimensional spherical representation panoramic image in a segmentation manner determined based on a preset rule, to obtain the plurality of segmented regions.

In an embodiment, the plurality of segmented regions are obtained by segmenting the panoramic video three-dimensional spherical representation panoramic image based on a preset angle of view separation rule; or the plurality of segmented regions are obtained by segmenting the panoramic video three-dimensional spherical representation panoramic image in a latitude direction; and/or the plurality of segmented regions are obtained by segmenting the panoramic video three-dimensional spherical representation panoramic image in a longitude direction.

In an embodiment, the segmenting the panoramic video three-dimensional spherical representation panoramic image, to obtain the plurality of segmented regions includes: clustering a plurality of pixels included in the panoramic video two-dimensional planar projection, to obtain a plurality of pixel sets; separately mapping the plurality of pixels onto the panoramic video three-dimensional spherical representation panoramic image; and using, as a first segmented region, a region including a mapping point that corresponds to a pixel included in a first pixel set and that is in the panoramic video three-dimensional spherical representation panoramic image, where the first pixel set is one of the plurality of pixel sets, and the first segmented region is one of the plurality of segmented regions.

In an embodiment, the segmenting the panoramic video three-dimensional spherical representation panoramic image, to obtain the plurality of segmented regions includes: separately mapping a plurality of pixels included in the panoramic video two-dimensional planar projection onto the panoramic video three-dimensional spherical representation panoramic image, to obtain a plurality of mapping points; clustering the plurality of mapping points, to obtain a plurality of mapping point sets; and using, as a second segmented region, a region including a mapping point included in a first mapping point set, where the first mapping point set is one of the plurality of mapping point sets, and the second segmented region is one of the plurality of segmented regions.

In this application, the panoramic video three-dimensional spherical representation panoramic image may be segmented in one of the foregoing plurality of segmentation methods, to obtain the plurality of segmented regions. This may be applied to a pixel distribution of the panoramic video two-dimensional planar projection, so that tone mapping can be in a unit of a segmented region, and tone mapping can be implemented in a small dynamic range, to improve tone mapping efficiency.

According to a third aspect, this application provides a display apparatus, including a segmentation module, a determining module, and a mapping module.

The determining module is configured to determine one or more target metadata information units of a first pixel from a plurality of metadata information units. The plurality of metadata information units are obtained by parsing a bitstream, the first pixel is any pixel in a to-be-processed panoramic video two-dimensional planar projection, the plurality of metadata information units correspond to a plurality of segmented regions included in a panoramic video three-dimensional spherical representation panoramic image, and there is a mapping relationship between the panoramic video two-dimensional planar projection and the panoramic video three-dimensional spherical representation panoramic image. The mapping module is configured to perform tone mapping on a pixel value of the first pixel based on the one or more target metadata information units to obtain a target tone mapping value of the first pixel.

In an embodiment, the segmentation module is configured to obtain the plurality of segmented regions.

In an embodiment, the segmentation module is configured to segment the panoramic video three-dimensional spherical representation panoramic image in a preset segmentation manner, to obtain the plurality of segmented regions.

In an embodiment, the segmentation module is configured to segment the panoramic video three-dimensional spherical representation panoramic image in a segmentation manner obtained by parsing the bitstream, to obtain the plurality of segmented regions.

In an embodiment, the plurality of segmented regions are obtained by segmenting the panoramic video three-dimensional spherical representation panoramic image based on a preset angle of view separation rule; or the plurality of segmented regions are obtained by segmenting the panoramic video three-dimensional spherical representation panoramic image in a latitude direction; and/or the plurality of segmented regions are obtained by segmenting the panoramic video three-dimensional spherical representation panoramic image in a longitude direction.

In an embodiment, the segmentation module is configured to: cluster a plurality of pixels included in the panoramic video two-dimensional planar projection, to obtain a plurality of pixel sets; separately map the plurality of pixels onto the panoramic video three-dimensional spherical representation panoramic image; and use, as a first segmented region, a region including a mapping point that corresponds to a pixel included in a first pixel set and that is in the panoramic video three-dimensional spherical representation panoramic image. The first pixel set is one of the plurality of pixel sets, and the first segmented region is one of the plurality of segmented regions.

In an embodiment, the segmentation module is configured to: separately map a plurality of pixels included in the panoramic video two-dimensional planar projection onto the panoramic video three-dimensional spherical representation panoramic image, to obtain a plurality of mapping points; cluster the plurality of mapping points, to obtain a plurality of mapping point sets; and use, as a second segmented region, a region including a mapping point included in a first mapping point set, where the first mapping point set is one of the plurality of mapping point sets, and the second segmented region is one of the plurality of segmented regions.

In an embodiment, the segmentation module is configured to obtain the plurality of segmented regions based on indication information of the plurality of segmented regions obtained by parsing the bitstream.

In an embodiment, the determining module is configured to: determine a correspondence between the plurality of metadata information units and the plurality of segmented regions, where one metadata information unit corresponds to one or more segmented regions; determine one or more target segmented regions based on a specified mapping point; and when there is only one target segmented region, determine a metadata information unit corresponding to the one target segmented region as the one target metadata information unit; or when there are a plurality of target segmented regions, determine metadata information units respectively corresponding to the plurality of target segmented regions as the plurality of target metadata information units.

In an embodiment, the determining module is configured to: extract a current metadata information unit from the plurality of metadata information units in a first preset sequence; extract a current segmented region from the plurality of segmented regions in a second preset sequence; and establish a correspondence between the current segmented region and the current metadata information unit.

In an embodiment, the determining module is configured to: extract a current metadata information unit from the plurality of metadata information units in a first preset sequence; extract a current segmented region from the plurality of segmented regions in a traversing sequence obtained by parsing the bitstream; and establish a correspondence between the current segmented region and the current metadata information unit.

In an embodiment, the determining module is configured to: extract a current metadata information unit from the plurality of metadata information units in a first preset sequence; obtain one or more coordinates included in the current metadata information unit; determine one or more mapping points in the panoramic video three-dimensional spherical representation panoramic image based on the one or more coordinates; and when there is only one mapping point, establish a correspondence between the current metadata information unit and a segmented region to which the one mapping point belongs; or when there are a plurality of mapping points, establish a correspondence between the current metadata information unit and at least one segmented region to which the plurality of mapping points belong.

In an embodiment, the specified mapping point is a first mapping point of the first pixel in the panoramic video three-dimensional spherical representation panoramic image, and the determining module is configured to: determine a first coverage area in the panoramic video three-dimensional spherical representation panoramic image by using the first mapping point as a center; and when the first coverage area includes one segmented region, determine the one segmented region as one target segmented region; or when the first coverage area includes a plurality of segmented regions, determine the plurality of segmented regions as a plurality of target segmented regions.

In an embodiment, the specified mapping point is a point of view center in the panoramic video three-dimensional spherical representation panoramic image, and the determining module is configured to: determine a second segmented region to which the point of view center belongs, where the plurality of segmented regions include the second segmented region; and determine the second segmented region as one target segmented region.

In an embodiment, the specified mapping point is a point of view center in the panoramic video three-dimensional spherical representation panoramic image, and the determining module is configured to: determine a second coverage area in the panoramic video three-dimensional spherical representation panoramic image by using the point of view center as a center; and when the second coverage area includes one segmented region, determine the one segmented region as the one target segmented region; or when the second coverage area includes a plurality of segmented regions, determine the plurality of segmented regions as a plurality of target segmented regions.

In an embodiment, the mapping module is configured to: obtain one or more tone mapping curves based on the one or more target metadata information units; when there is only one tone mapping curve, perform tone mapping on the pixel value of the first pixel based on the one tone mapping curve, to obtain the target tone mapping value; or when there are a plurality of tone mapping curves, separately perform tone mapping on the pixel value of the first pixel based on the plurality of tone mapping curves, to obtain a plurality of tone median values of the first pixel; and obtain the target tone mapping value based on the plurality of tone median values.

In an embodiment, the mapping module is configured to: determine a median value in the plurality of tone median values as the target tone mapping value; or perform weighted averaging on the plurality of tone median values, to obtain the target tone mapping value, where a weighting coefficient of the plurality of tone median values is preset, or a weighting coefficient of the plurality of tone median values is related to a distance between the first pixel and a central point of each segmented region, or a weighting coefficient of the plurality of tone median values is related to area proportions of segmented regions respectively corresponding to the plurality of target metadata information units.

According to a fourth aspect, this application provides a front end apparatus, including a segmentation module, an obtaining module, and a generation module.

The obtaining module is configured to obtain at least one mapping point included in a first segmented region. The first segmented region is one of a plurality of segmented regions included in a panoramic video three-dimensional spherical representation panoramic image, there is a mapping relationship between the panoramic video three-dimensional spherical representation panoramic image and a to-be-processed panoramic video two-dimensional planar projection, and the at least one mapping point corresponds to at least one pixel in the panoramic video two-dimensional planar projection. The generation module is configured to: generate a metadata information unit of the first segmented region based on the at least one pixel; and write the metadata information unit of the first segmented region into a bitstream.

In an embodiment, the generation module is further configured to: when histograms and/or luminance of the first segmented region and the second segmented region meet/meets a specified condition, merge a metadata information unit of the first segmented region and a second metadata information unit of the second segmented region, to obtain a metadata information unit of the first segmented region and the second segmented region, where the second segmented region is one of the plurality of segmented regions.

In an embodiment, the segmentation module is configured to: map the panoramic video two-dimensional planar projection onto the panoramic video three-dimensional spherical representation panoramic image; and segment the panoramic video three-dimensional spherical representation panoramic image, to obtain the plurality of segmented regions.

In an embodiment, the segmentation module is configured to segment the panoramic video three-dimensional spherical representation panoramic image in a preset segmentation manner, to obtain the plurality of segmented regions.

In an embodiment, the segmentation module is configured to segment the panoramic video three-dimensional spherical representation panoramic image in a segmentation manner determined based on a preset rule, to obtain the plurality of segmented regions.

In an embodiment, the plurality of segmented regions are obtained by segmenting the panoramic video three-dimensional spherical representation panoramic image based on a preset angle of view separation rule; or the plurality of segmented regions are obtained by segmenting the panoramic video three-dimensional spherical representation panoramic image in a latitude direction; and/or the plurality of segmented regions are obtained by segmenting the panoramic video three-dimensional spherical representation panoramic image in a longitude direction.

In an embodiment, the segmentation module is configured to: cluster a plurality of pixels included in the panoramic video two-dimensional planar projection, to obtain a plurality of pixel sets; separately map the plurality of pixels onto the panoramic video three-dimensional spherical representation panoramic image; and use, as a first segmented region, a region including a mapping point that corresponds to a pixel included in a first pixel set and that is in the panoramic video three-dimensional spherical representation panoramic image. The first pixel set is one of the plurality of pixel sets, and the first segmented region is one of the plurality of segmented regions.

In an embodiment, the segmentation module is configured to: separately map a plurality of pixels included in the panoramic video two-dimensional planar projection onto the panoramic video three-dimensional spherical representation panoramic image, to obtain a plurality of mapping points; cluster the plurality of mapping points, to obtain a plurality of mapping point sets; and use, as a second segmented region, a region including a mapping point included in a first mapping point set, where the first mapping point set is one of the plurality of mapping point sets, and the second segmented region is one of the plurality of segmented regions.

According to a fifth aspect, this application provides a terminal device, including: one or more processors; and a memory, configured to store one or more programs. When the one or more programs are executed by the one or more processors, the one or more processors are enabled to implement the method according to any implementation of the first aspect and the second aspect.

According to a sixth aspect, this application provides a computer-readable storage medium, including a computer program. When the computer program is executed on a computer, the computer is enabled to perform the method according to any implementation of the first aspect and the second aspect.

According to a seventh aspect, this application provides a computer program product. The computer program product includes computer program code, and when the computer program code is run on a computer, the computer is enabled to perform the method according to any implementation of the first aspect and the second aspect.

DESCRIPTION OF EMBODIMENTS

Figure 1:
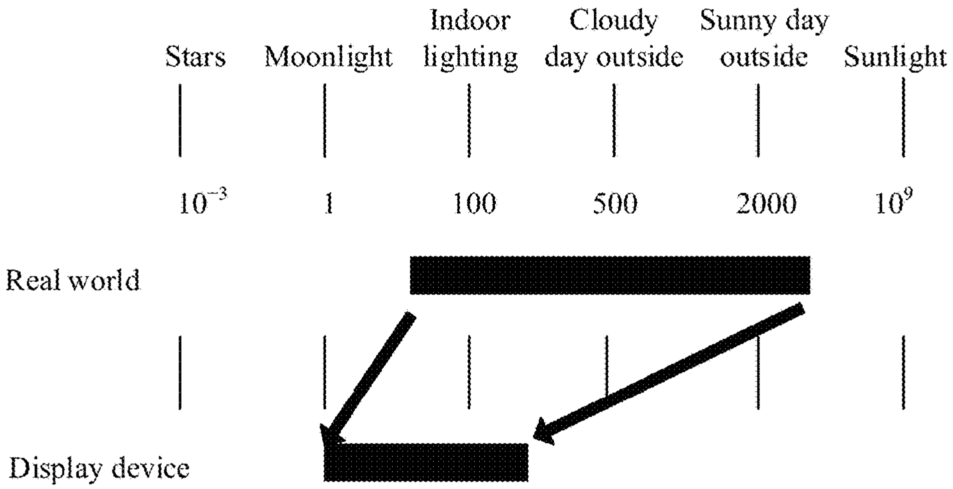
FIG. 1 is an example diagram of dynamic-range mapping in an imaging process in a real world.

To make the objectives, technical solutions, and advantages of this application clearer, the following clearly describes the technical solutions of this application with reference to the accompanying drawings in this application. It is clear that, the described embodiments are merely some rather than all of the embodiments of the application. All other embodiments obtained by one of ordinary skilled in the art based on embodiments of this application without creative efforts shall fall within the protection scope of this application.

In the specification, embodiments, claims, and accompanying drawings of this application, terms “first”, “second”, and the like are merely intended for distinguishing and description, and shall not be understood as an indication or implication of relative importance or an indication or implication of a sequence. In addition, the terms “include”, “have”, and any variant thereof are intended to cover non-exclusive inclusion, for example, include a series of steps or units. A method, a system, a product, or a device is not necessarily limited to clearly listed steps or units, but may include other steps or units that are not clearly listed and that are inherent to the process, the method, the product, or the device.

It should be understood that in this application, “at least one (item)” means one or more, and “a plurality of” means two or more. The term “and/or” describes an association relationship of associated objects, and indicates that three relationships may exist. For example, “A and/or B” may indicate the following three cases: Only A exists, only B exists, and both A and B exist. A and B may be singular or plural. The character “/” usually indicates an “or” relationship between the associated objects. “At least one of the following items (pieces)” or a similar expression thereof indicates any combination of these items, including a single item (piece) or any combination of a plurality of items (pieces). For example, at least one item (piece) in a, b, or c may indicate a, b, c, a and b, a and c, b and c, or a, b, and c. Herein, a, b, and c may be singular or plural.

The following describes some conventional technologies in embodiments of this application:

1. Dynamic Range

The dynamic range indicates a ratio between a maximum value and a minimum value of a variable in many fields. In a digital image, the dynamic range indicates a ratio between a maximum grayscale value and a minimum grayscale value in an image displayable range.

In the nature, luminance of a night scene under the stars is approximately 0.001 cd/$m^2$, luminance of the sun is up to $10^9$, and the dynamic range may reach a magnitude of $10^9/0.001=10^{12}$. However, in a real world of the nature, the luminance of the sun and luminance of starlight are not both obtained. Therefore, for a same scene of the real world, a dynamic range of the real world is usually between $10^{-3}$ cd/$m^2$ and $10^6$ cd/$m^2$, and is referred to as a high dynamic range (high dynamic range, HDR). Currently, in a large quantity of color digital images, grayscales of three channels of red (R), green (G), and blue (B) channels each are stored by using one byte. In other words, grayscale ranges of the three channels of R, G, and B channels each are 0-255. 0-255 are a dynamic range of the image, and are referred to as a low dynamic range (low dynamic range, LDR).

2. Optical-Electro Transfer Function (OETF)

An imaging process of a digital camera is actually mapping from a high dynamic range of a real world to a low dynamic range of a digital image. FIG. 1 is an example diagram of dynamic-range mapping in an imaging process in a real world. As shown in FIG. 1, in addition to luminance of starlight and luminance of the sun, the real world further includes: luminance of moonlight is 1 cd/$m^2$, luminance of indoor lighting is 100 cd/$m^2$, luminance of a cloudy day is 500 $cd/m^2$, and luminance of a sunny day outside is 2000 $cd/m^2$. In the real world, there is a mapping relationship between a luminance range 100 $cd/m^2$ to 2000 $cd/m^2$ and a luminance range 1 $cd/m^2$ to 200 $cd/m^2$ corresponding to a storage manner of a display device.

Because the storage manner of the display device cannot achieve high luminance in the real world, the optical-electro transfer function (OETF) needs to be used to represent luminance in the real world as luminance corresponding to the storage manner of the display device. For example, if the luminance in the real world is 10000 $cd/m^2$, and the display device stores luminance information by using 10 bits, a maximum value that may be stored is 1023 in this storage manner. Therefore, 10000 $cd/m^2$ may be represented as 1023.

An earlier display device is a cathode ray tube (CRT) display, and an optical-electro transfer function of the cathode ray tube display is a Gamma function. The Gamma function is defined in the ITU-R Recommendation BT. 1886 standard.

$$V=\begin{cases}1.099L^{0.45}-0.099, & 1\geq L\geq 0.018\\ 4.500, & 0.018\geq L\geq 0\end{cases}$$

With upgradation of the display device, a luminance range of the display device continuously increases. Luminance of an existing HDR display reaches 600 $cd/m^2$, and luminance of a high-end HDR display can reach 2000 $cd/m^2$. Therefore, an improved optical-electro transfer function is required for adapting to upgradation of the display device. Currently, there are three common optical-electro transfer functions: a perceptual quantizer (PQ) optical-electro transfer function, a hybrid log-gamma (HLG) optical-electro transfer function, and a scene luminance fidelity (SLF) optical-electro transfer function.

Figure 2:
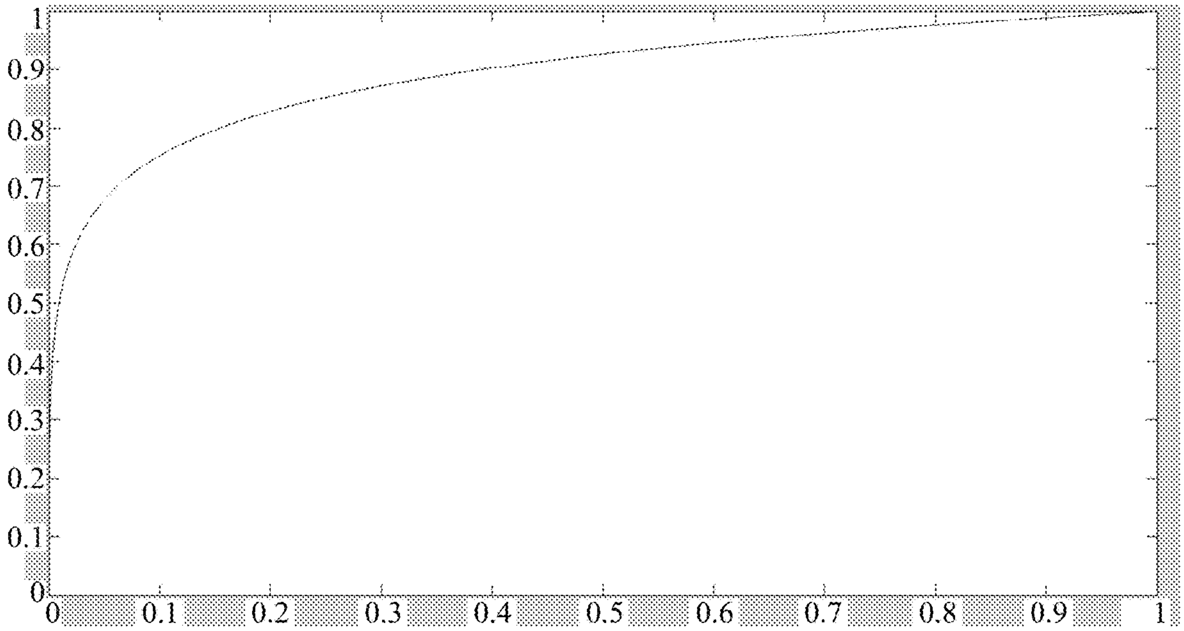
FIG. 2 is a schematic diagram of a curve of a PQ optical-electro transfer function.

(1) The PQ optical-electro transfer function is different from a conventional Gamma function. The PQ optical-electro transfer function is proposed based on a contrast perception model of human eyes under different luminance. The PQ optical-electro transfer function represents a relationship of conversion from a linear signal value of a pixel of an image frame to a nonlinear signal value in a PQ domain. FIG. 2 is a schematic diagram of a curve of a PQ optical-electro transfer function. The PQ optical-electro transfer function may be expressed as:

$$\begin{cases}R'=\mathrm{PQ\_TF}(\max(0,\min(R/10000m1)))\\ G'=\mathrm{PQ\_TF}(\max(0,\min(G/10000,1)))\\ B'=\mathrm{PQ\_TF}(\max(0,\min(B/10000,1)))\end{cases}$$

Parameters corresponding to R, G, and B in the formula may be calculated according to a formula $$L'=\mathrm{PQ\_TF}(L)=\left(\frac{C_1+C_2L^{m_1}}{1+C_3L^{m_1}}\right)^{m_2}.$$

Herein, L represents the linear signal value of the pixel of the image frame, and a value of L is normalized to [0, 1]; L' represents the nonlinear signal value in the PQ domain, and a value range of L' is [0, 1]; and $m_1$, $m_2$, $c_1$, $c_2$, and $c_3$ are all PQ optical-electro transfer coefficients.

$$m_1=\frac{2610}{4096}\times\frac{1}{4}=0.1593017578125;$$

$$m_2=\frac{2523}{4096}\times 128=78.84375;$$

$$c_2=\frac{2413}{4096}\times 32=18.8515625;$$

$$c_3=\frac{2392}{4096}\times 32=18.6875;\text{ and}$$

$$c_1=c_3-c_2+1=\frac{3424}{4096}=0.8359375.$$

Figure 3:
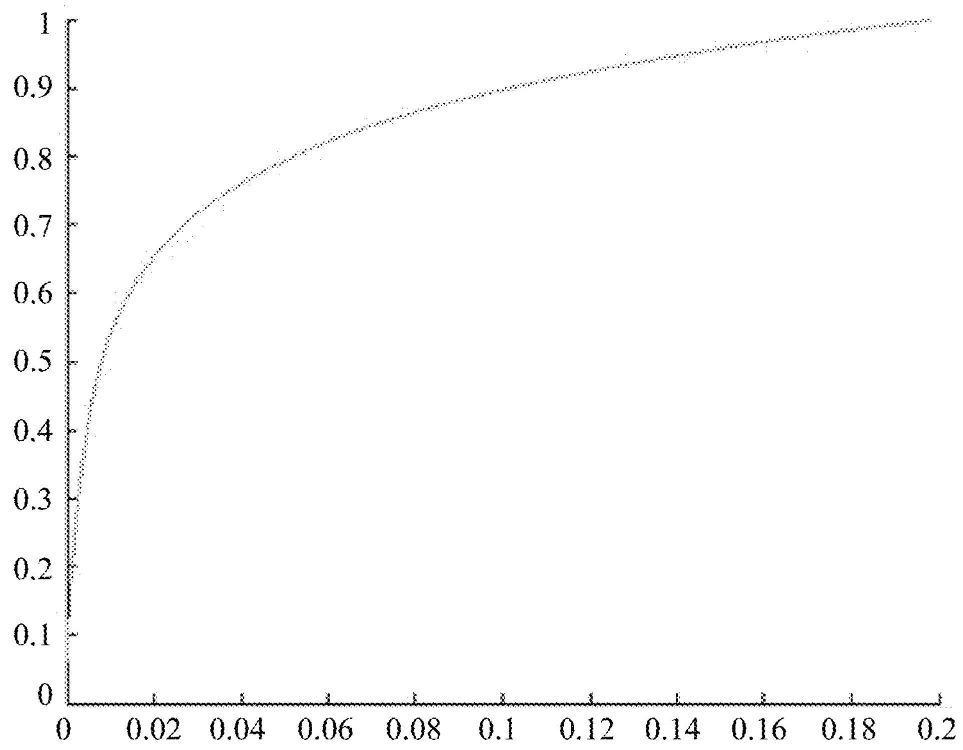
FIG. 3 is a schematic diagram of a curve of an HLG optical-electro transfer function.

(2) The HLG optical-electro transfer function is obtained by improving a conventional Gamma curve. In the HLG optical-electro transfer function, the conventional Gamma curve is used in a low segment, and a log curve is supplemented in a high segment. The HLG optical-electro transfer function represents a relationship of conversion from a linear signal value of a pixel of an image frame to a nonlinear signal value in an HLG domain. FIG. 3 is a schematic diagram of a curve of an HLG optical-electro transfer function. The HLG optical-electro transfer function may be expressed as:

$$L'=\mathrm{HLG\_TF}(L)=\begin{cases}\sqrt{L}/2, & 0\leq L\leq 1\\ a\ln(L-b)+c, & 1<L\end{cases}$$

Herein, L represents the linear signal value of the pixel of the image frame, and a value of L is normalized to [0, 12]; L' represents the nonlinear signal value in the HLG domain, and a value range of L' is [0, 1]; and a, b, and c are all HLG optical-electro transfer coefficients, a=0.17883277, b=0.28466892, and c=0.55991073.

Figure 4:
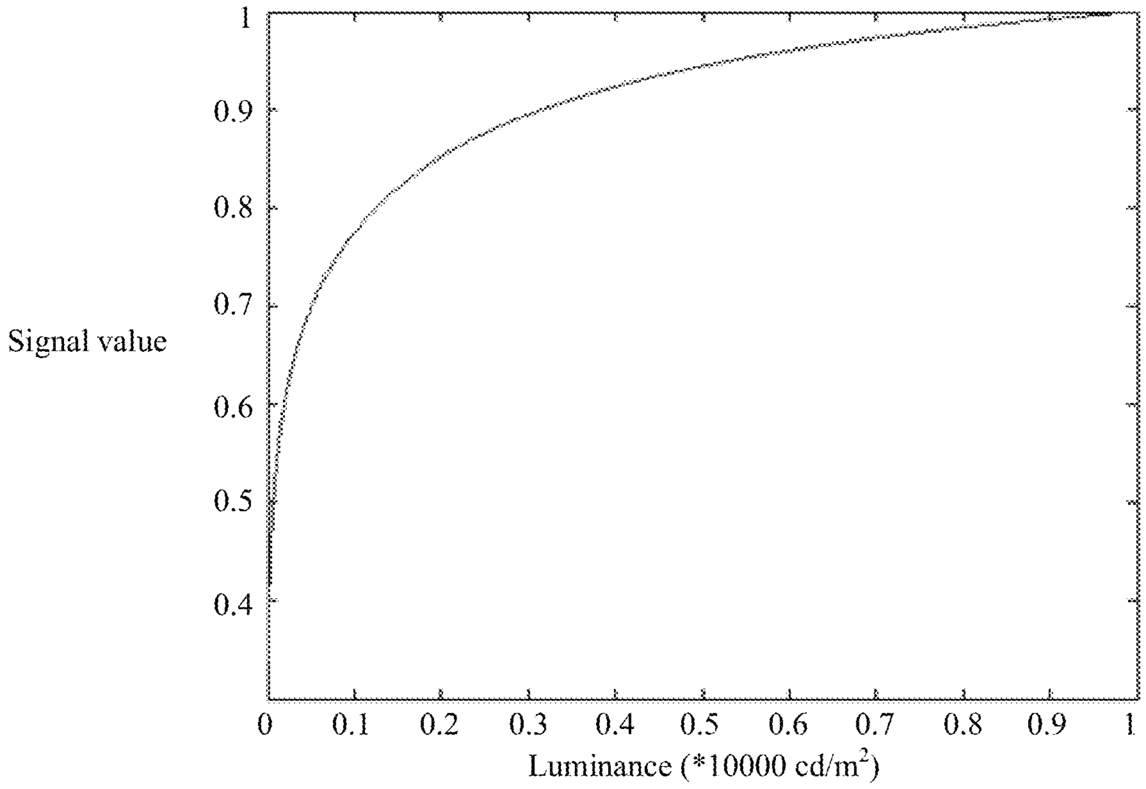
FIG. 4 is a schematic diagram of a curve of an SLF optical-electro transfer function.

(3) The SLF optical-electro transfer function is obtained based on an HDR scene luminance distribution while optical characteristics of human eyes are satisfied. The SLF optical-electro transfer function represents a relationship of conversion from a linear signal value of a pixel of an image frame to a nonlinear signal value in an SLF domain. FIG. 4 is a schematic diagram of a curve of an SLF optical-electro transfer function. The SLF optical-electro transfer function may be expressed as:

$$\begin{cases}R'=\mathrm{SLF\_TF}(\max(0,\min(R/10000m1)))\\ G'=\mathrm{SLF\_TF}(\max(0,\min(G/10000,1)))\\ B'=\mathrm{SLF\_TF}(\max(0,\min(B/10000,1)))\end{cases}$$

Parameters corresponding to R, G, and B in the formula may be calculated according to the following formula:

$$L'=\mathrm{SLF\_TF}(L)=a\times\left(\frac{p\times L}{(p-1)\times L}\right)^m+b.$$

Herein, L represents the linear signal value of the pixel of the image frame, and a value of L is normalized to [0, 1]; L' represents the nonlinear signal value in the PQ domain, and a value range of L' is [0, 1]; and p, m, a, and b are all SLF optical-electro transfer coefficients, p=2.3, m=0.14, a=1.12762, and b=−0.12762.

3. Dynamic-Range Mapping

Dynamic-range mapping may be applied to adaptation between an HDR signal of a front end and an HDR display device of a display end. For example, the front end collects a luminance signal at 4000 cd/$m^2$, and an HDR display capability of the HDR display device of the display end is 500 cd/$m^2$. Mapping the luminance signal at 4000 cd/$m^2$ onto the display device whose HDR display capability is 500 cd/$m^2$ is a high-to-low tone mapping (TM) process. Dynamic-range mapping may be further applied to adaptation between an SDR signal of the front end and the HDR display device of the display end. For example, the front end collects a luminance signal at 100 cd/$m^2$, and the HDR display capability of the HDR display device of the display end is 2000 cd/$m^2$. Mapping the luminance signal at 100 cd/$m^2$ to the display device whose HDR display capability is 2000 cd/$m^2$ is a low-to-high TM process.

Currently, there may be two dynamic-range mapping methods: a static mapping method and a dynamic mapping method. In the static mapping method, a single piece of data is used to perform an entire TM process based on same video content or same hard disk content. In other words, there is usually a same mapping curve for various scenes. The method has advantages that a video needs to carry less data and a processing procedure is simple, but has a disadvantage that information may be lost in some scenes because a same mapping curve is used for TM in all scenes. For example, if the mapping curve focuses on protecting a bright region, some details may be lost or completely invisible in some extremely dark scenes. Consequently, video display effect is affected. According to the dynamic mapping method, a mapping curve is dynamically adjusted for each scene or each frame of content based on an region. This method has an advantage that differentiated processing can be implemented for different scenes or frames, but has a disadvantage that a video needs to carry a large amount of data because related scene information needs to be carried in each frame or scene.

4. TM Technology (1) TM Process Based on a Sigmoidal Curve

Figure 5:
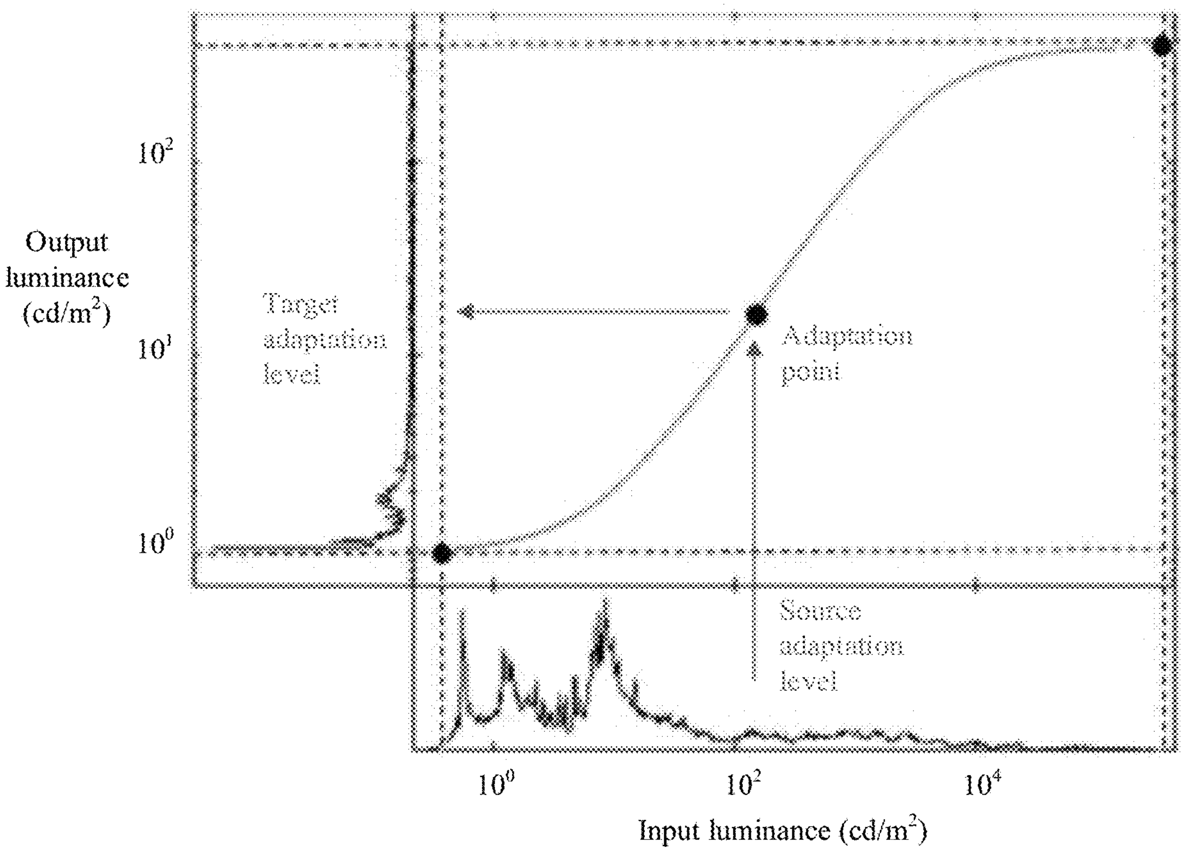
FIG. 5 is a schematic diagram of a sigmoidal curve.

FIG. 5 is a schematic diagram of a sigmoidal curve.

(2) TM Process Based on a Bezier Curve

Figure 6:
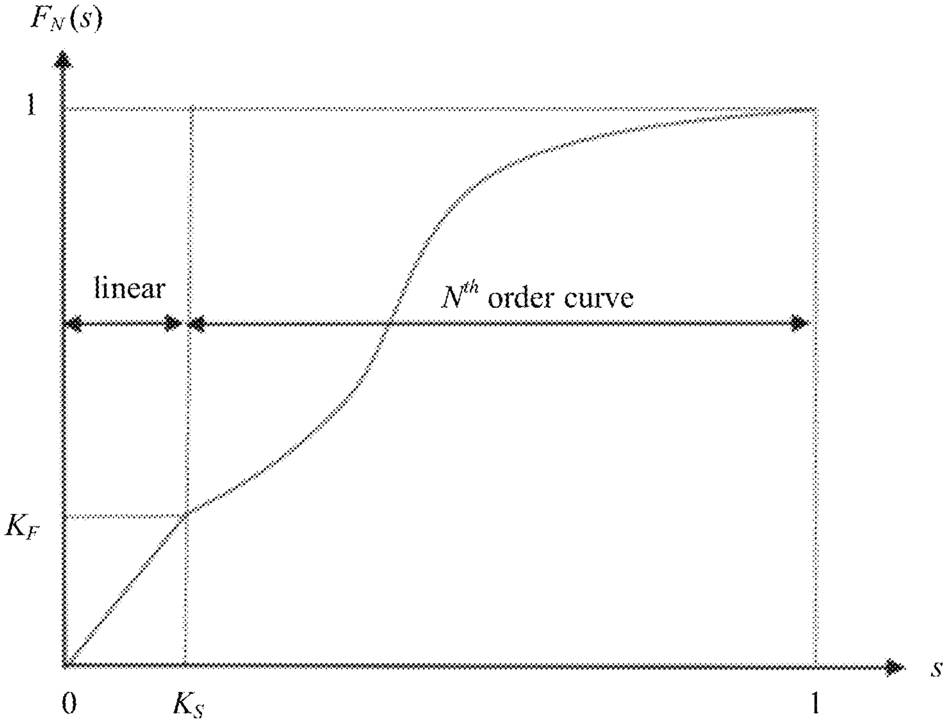
FIG. 6 is a schematic diagram of a Bezier curve.

FIG. 6 is a schematic diagram of a Bezier curve.

(3) TM Process Based on an S-Shaped Curve Perceived by Human Eyes

Figure 7:
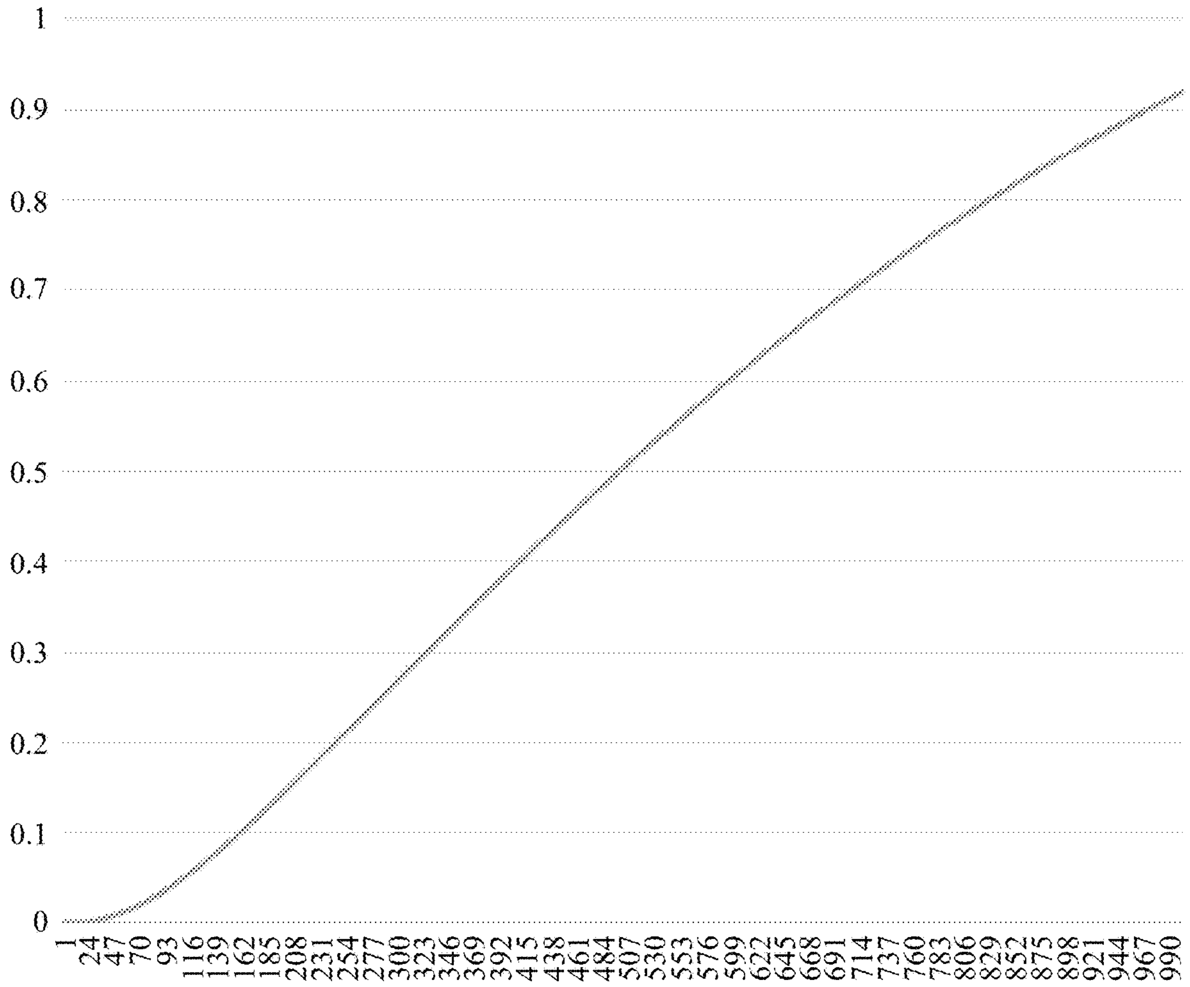
FIG. 7 is a schematic diagram of an S-shaped curve.

FIG. 7 is a schematic diagram of an S-shaped curve. An optical-electro transfer function corresponding to the S-shaped curve may be expressed as:

$$L' = F(L) = a\times\left(\frac{p\times L^n}{(k_1\times p - k_2)\times L^n + k_3}\right)^m + b$$

Herein, L and L' each are a normalized electrical signal or optical signal, and a value range of each of L and L' is [0, 1]; a value range of a is [0, 1]; a value range of b is [0, 1]; a value range of each of p, n, and m is [0, N], N is a rational number greater than 0.1, and $k_1$, $k_2$, and $k_3$ are all rational numbers.

5. Panoramic Video

The panoramic video can provide immersive visual experience. Main experience is as follows: (1) Content that describes a horizontal 360-degree and vertical 180-degree spherical scene is provided. (2) A window in a specified direction can be freely selected, for watching, by using a VR head-mounted device. A range covered by the panoramic video is larger than a horizontal 33-degree and vertical 19-degree narrow angle of view range of a common two-dimensional video.

Correspondingly, the panoramic video leads to a more serious problem that a dynamic range of device display is insufficient. Because an angle of view range of the two-dimensional video is small and luminance situations are similar, a dynamic range of the two-dimensional video is still within a controllable range. An angle of view range of the panoramic video is large. For example, video content is a daytime scene, and may include both a very bright region such as the sun in the sky and a dark region such as a building interior or a shadow. A dynamic range of the panoramic video is very large, and this poses a great challenge to description and display.

6. Metadata Information

A front end (video capturing and/or making) uses, to carry a parameter related to a mapping curve, metadata information to be sent to a display end (video display).

(1) Sigmoidal Curve

A metadata information definition that is related to the sigmoidal curve and that is proposed in ST 2094-10 includes not only statistical values of video luminance such as a maximum value (Maximum PQ-encoded maxRGB), a minimum value (Minimum PQ-encoded maxRGB), and an average value (Average PQ-encoded maxRGB); but also parameters related to the sigmoidal curve such as a tone mapping offset, a tone mapping gain (, and a tone mapping gamma, to directly generate the sigmoidal curve.

However, a manner of generating the parameters is fixed. Consequently, the parameters included in the metadata information cannot provide more flexibility for curve generation.

(2) Bezier Curve

A metadata information definition that is related to the Bezier curve and that is proposed in ST 2094-40 includes histogram information (Distribution MaxRGB) and parameters (Bezier curve anchors) related to the Bezier curve, to directly generate the Bezier curve.

In addition, the ST 2094 series standards include target system display maximum (peak) luminance (TSDAPL).

However, the parameters correspond to the TSDAPL when being generated at the front end, but a same curve is used for different display devices at the display end. Consequently, best Display Effect Cannot be Achieved.

(3) S-Shaped Curve

Metadata information may include statistical values of video luminance such as a maximum value, a minimum value, and an average value, and may further include parameters related to the S-shaped curve such as p, m, a, b, n, K1, K2, and K3.

Figure 8:
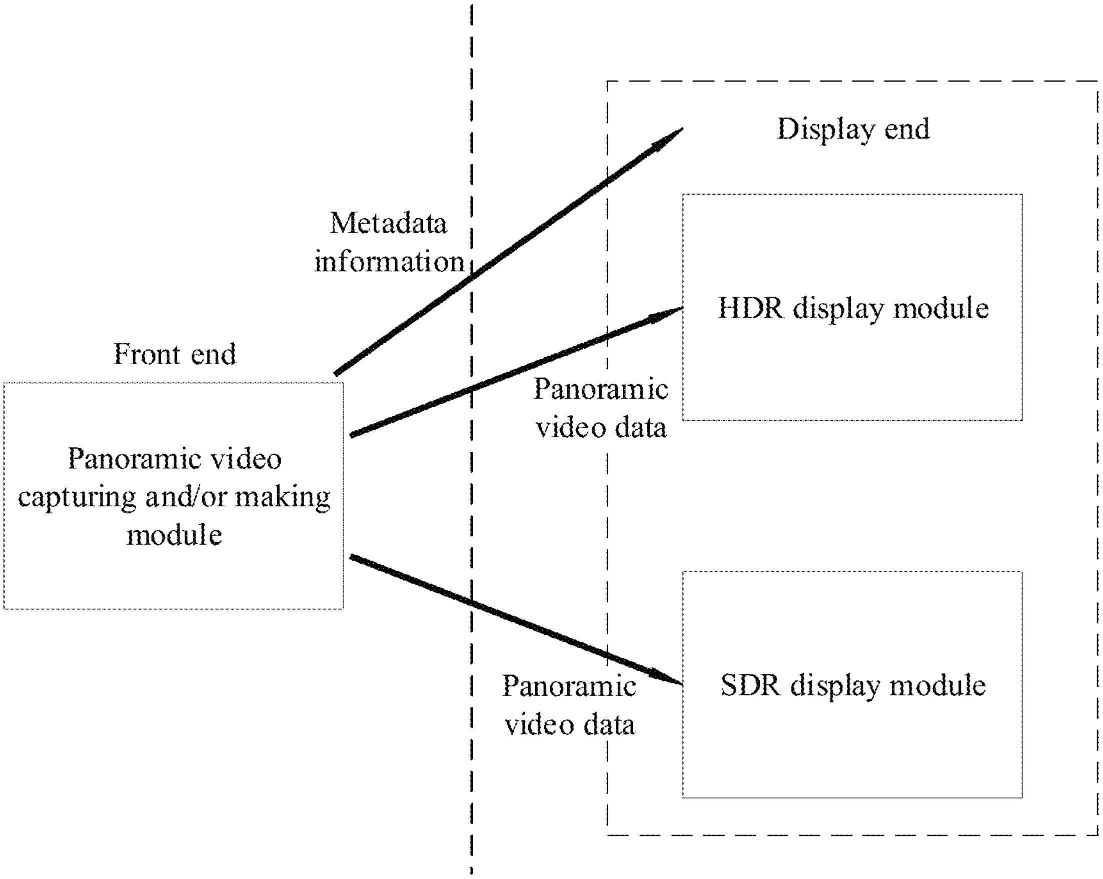
FIG. 8 is an example block diagram of a panoramic video playback system according to an embodiment of the application.

FIG. 8 is an example block diagram of a panoramic video playing system according to this application. As shown in FIG. 8, the panoramic video playing system includes a front end and a display end. The front end includes a panoramic video capturing and/or making module, and the display end includes an HDR display module and/or an SDR display module. The front end preprocesses captured panoramic video data, and then transmits the preprocessed panoramic video data to the display end. The preprocessed panoramic video data further carries metadata information of the panoramic video data. The display end performs, frame by frame based on the panoramic video data and with reference to the corresponding metadata information, enhancement processing on a plurality of image frames included in a panoramic video, to obtain and display an image with a color, luminance, a contrast, and the like that are all optimal.

In this application, the front end and the display end may be different physical devices independent of each other. For example, the front end may be a device having a video capturing function, for example, a video camera, a camera, or an image drawing machine, and the display end may be a device having a panoramic video playback function, for example, virtual reality (VR) glasses, a mobile phone, or a tablet. In this case, a wireless connection or a wired connection may be established between the front end and the display end. Technologies including long term evolution (LTE), 5th generation (5G) mobile communication, future mobile communication, and the like may be used for the wireless connection. The wireless connection may further include technologies such as wireless fidelity (Wi-Fi), Bluetooth, and near field communication (NFC). The wired connection may include an Ethernet connection, a local area network connection, and the like. This is not limited.

In this application, a function of the front end and a function of the display end may be further integrated into a same physical device, for example, a terminal device having a video capturing function such as a mobile phone or a tablet. In this application, some functions of the front end and some functions of the display end may be further integrated into a same physical device. This is not specifically limited.

Figure 9:
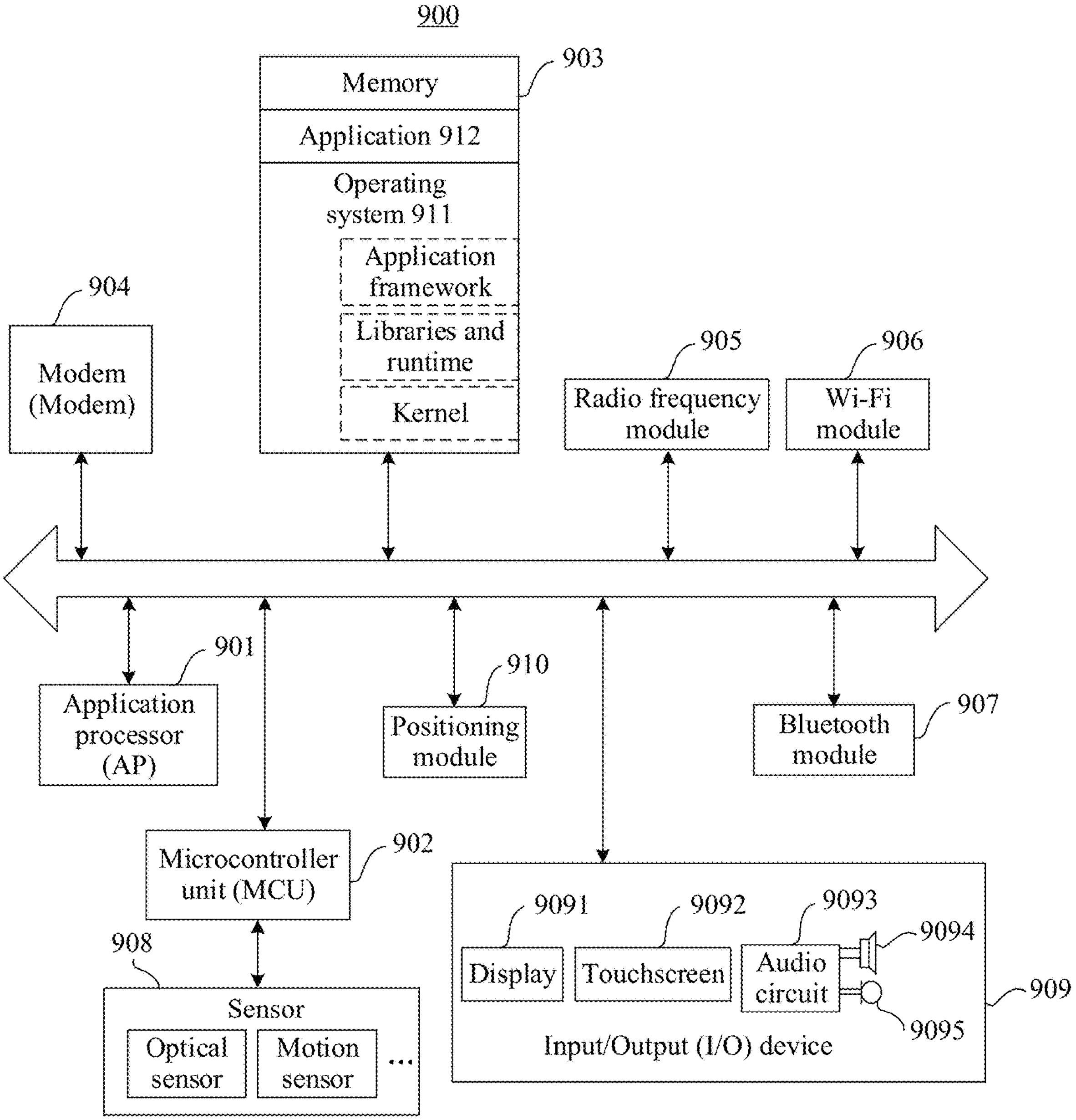
FIG. 9 is a schematic diagram of an example structure of a terminal device.

FIG. 9 is a schematic diagram of an example structure of a terminal device. As shown in FIG. 9, a terminal device 900 includes components such as an application processor 901, a microcontroller unit (MCU) 902, a memory 903, a modem 904, a radio frequency (RF) module 905, a wireless fidelity (Wi-Fi for short) module 906, a Bluetooth module 907, a sensor 908, an input/output (I/O) device 909, and a positioning module 910. These components can communicate with each other through one or more communication buses or signal cables. The communication bus or the signal cable may be a CAN bus provided in this application. One of ordinary skilled in the art may understand that, the terminal device 900 may include more or fewer components than those shown in the figure, or some components may be combined, or the components may be arranged in a different manner.

The following describes the components of the terminal device 900 with reference to FIG. 9.

The application processor 901 is a control center of the terminal device 900, and is connected to the components of the terminal device 900 through various interfaces and buses. In some embodiments, the processor 901 may include one or more processing units. The memory 903 stores a computer program such as an operating system 911 and an application 912 shown in FIG. 9. The application processor 901 is configured to execute the computer program in the memory 903, to implement a function defined by the computer program. For example, the application processor 901 executes the operating system 911 to implement various functions of the operating system on the terminal device 900. The memory 903 further stores data other than the computer program, for example, data generated during running of the operating system 911 and the application 912. The memory 903 is a nonvolatile storage medium, and usually includes an internal memory and an external memory. The internal memory includes but is not limited to a random access memory (RAM), a read-only memory (ROM), a cache, or the like. The external memory includes but is not limited to a flash memory, a hard disk, a compact disc, a universal serial bus (USB) flash drive, or the like. The computer program is usually stored in the external memory. Before executing the computer program, the processor loads the program from the external memory to the internal memory.

The memory 903 may be independent, and is connected to the application processor 901 through a bus. Alternatively, the memory 903 and the application processor 901 may be integrated into a chip subsystem.

The MCU 902 is a coprocessor configured to obtain and process data from the sensor 908. The MCU 902 has a weaker processing capability and lower power consumption than the application processor 901, but has a feature of "always on", and may continuously collect and process sensor data when the application processor 901 is in a sleep mode, to ensure normal running of the sensor with very low power consumption. In an embodiment, the MCU 902 may be a sensor hub chip. The sensor 908 may include an optical sensor and a motion sensor. In an embodiment, the optical sensor may include an ambient light sensor and a proximity sensor. The ambient light sensor may adjust luminance of a display 9091 based on luminance of ambient light. The proximity sensor may power off a display when the terminal device 900 approaches an ear. As a type of motion sensor, an accelerometer sensor may detect values of acceleration in various directions (usually on three axes), and may detect a value and a direction of gravity when the accelerometer sensor is still. The sensor 908 may further include another sensor, for example, a gyroscope, a barometer, a hygrometer, a thermometer, or an infrared sensor. Details are not described herein. The MCU 902 and the sensor 908 may be integrated into a same chip, or may be separate components connected through a bus.

The modem 904 and the radio frequency module 905 constitute a communication subsystem of the terminal device 900, and are configured to implement main functions in a wireless communication standard protocol. The modem 904 is configured to perform encoding/decoding, signal modulation/demodulation, equalization, and the like. The radio frequency module 905 is configured to receive and send a radio signal. The radio frequency module 905 includes but is not limited to an antenna, at least one amplifier, a coupler, a duplexer, and the like. The radio frequency module 905 cooperates with the modem 904 to implement a wireless communication function. The modem 904 may serve as an independent chip, or may be combined with another chip or circuit to form a system-level chip or an integrated circuit. These chips or integrated circuits may be applied to all terminal devices that implement the wireless communication function, including a mobile phone, a computer, a notebook computer, a tablet, a router, a wearable device, a vehicle, a home appliance, and the like.

The terminal device 900 may further perform wireless communication by using the Wi-Fi module 906, the Bluetooth module 907, or the like. The Wi-Fi module 906 is configured to provide, to the terminal device 900, network access that complies with a Wi-Fi related standard protocol. The terminal device 900 may access a Wi-Fi access point by using the Wi-Fi module 906, to access the Internet. In some other embodiments, the Wi-Fi module 906 may alternatively serve as a Wi-Fi wireless access point, and may provide Wi-Fi network access to another terminal device. The Bluetooth module 907 is configured to implement short-range communication between the terminal device 900 and another terminal device (for example, a mobile phone or a smartwatch). The Wi-Fi module 906 in this embodiment of this application may be an integrated circuit, a Wi-Fi chip, or the like. The Bluetooth module 907 may be an integrated circuit, a Bluetooth chip, or the like.

The positioning module 910 is configured to determine a geographical location of the terminal device 900. It may be understood that the positioning module 910 may be a receiver of a positioning system, for example, a global positioning system (GPS), a BeiDou navigation satellite system, or a Russian GLONASS.

The Wi-Fi module 906, the Bluetooth module 907, and the positioning module 910 may be independent chips or integrated circuits, or may be integrated together. For example, in an embodiment, the Wi-Fi module 906, the Bluetooth module 907, and the positioning module 910 may be integrated into a same chip. In another embodiment, the Wi-Fi module 906, the Bluetooth module 907, the positioning module 910, and the MCU 902 may alternatively be integrated into a same chip.

The input/output device 909 includes but is not limited to the display 9091, a touchscreen 9092, an audio circuit 9093, and the like.

The touchscreen 9092 may collect a touch event of a user of the terminal device 900 on or near the touchscreen 9092 (for example, an operation performed by the user on or near the touchscreen 9092 by using a finger or any suitable object, for example, a stylus), and send the collected touch event to another component (for example, the application processor 901). The operation performed by the user near the touchscreen 9092 may be referred to as a floating touch. Through floating touch, the user may select, move, or drag a target (for example, an icon) without directly touching the touchscreen 9092. In addition, the touchscreen 9092 may be implemented by using a plurality of types such as a resistive type, a capacitive type, an infrared type, and a surface acoustic wave type.

The display (also referred to as a display) 9091 is configured to display information entered by the user or information displayed to the user. The display 9091 may be configured in a form, for example, a liquid crystal display or an organic light-emitting diode. The touchscreen 9092 may cover the display 9091. After detecting a touch event, the touchscreen 9092 transmits the touch event to the application processor 901 to determine a type of the touch event. Then, the application processor 901 may provide a corresponding visual output on the display 9091 based on the type of the touch event. In FIG. 9, the touchscreen 9092 and the display 9091 serve as two independent components to implement input and output functions of the terminal device 900. However, in some embodiments, the touchscreen 9092 and the display 9091 may be integrated to implement the input and output functions of the terminal device 900. In addition, the touchscreen 9092 and the display 9091 may be disposed on a front side of the terminal device 900 in a full panel form, to implement a bezel-less structure.

The audio circuit 9093, a speaker 9094, and a microphone 9095 may provide an audio interface between the user and the terminal device 900. The audio circuit 9093 may transmit, to the speaker 9094, an electrical signal into which received audio data is converted. The speaker 9094 converts the electrical signal into a sound signal for output. In addition, the microphone 9095 converts a collected sound signal into an electrical signal, the audio circuit 9093 receives the electrical signal, converts the electrical signal into audio data, and then sends the audio data to, for example, another terminal device by using the modem 904 and the radio frequency module 905, or outputs the audio data to the memory 903 for further processing.

In addition, the terminal device 900 may further have a fingerprint recognition function. For example, a fingerprint collection component may be configured on a back side of the terminal device 900 (for example, a lower part of a rear-facing camera), or a fingerprint collection component may be configured on the front side of the terminal device 900 (for example, a lower part of the touchscreen 9092). For another example, a fingerprint collection component may be configured in the touchscreen 9092 to implement the fingerprint recognition function. For example, the fingerprint collection component may be integrated with the touchscreen 9092 to implement the fingerprint recognition function of the terminal device 900. In this case, the fingerprint collection component is configured in the touchscreen 9092, and may be a part of the touchscreen 9092 or may be configured in the touchscreen 9092 in another manner. A main part of the fingerprint collection component in this embodiment of this application is a fingerprint sensor. The fingerprint sensor may use any type of sensing technology, including but not limited to an optical sensing technology, a capacitive sensing technology, a piezoelectric sensing technology, an ultrasonic wave sensing technology, or the like.

Further, the operating system 911 used in the terminal device 900 may be iOS®, Android®, Microsoft®, or another operating system. This is not limited in this embodiment of this application.

The terminal device 900 using the Android® operating system is used as an example. The terminal device 900 may logically include a hardware layer, the operating system 911, and an application layer. The hardware layer includes hardware resources such as the application processor 901, the MCU 902, the memory 903, the modem 904, the Wi-Fi module 906, sensor 908, and the positioning module 910. The application layer includes one or more applications, for example, the application 912. The application 912 may be an application of any type, for example, a social application, an e-commerce application, or a browser. The operating system 911 serves as software middleware between the hardware layer and the application layer, and is a computer program for managing and controlling hardware and software resources.

In an embodiment, the operating system 911 includes a kernel, a hardware abstraction layer (HAL), libraries and runtime, and a framework. The kernel is configured to provide an underlying system component and service, for example, power management, memory management, thread management, and a hardware driver. The hardware driver includes a Wi-Fi driver, a sensor driver, a positioning module driver, and the like. The hardware abstraction layer may be obtained by encapsulating a kernel driver program, provides an interface to the framework, and shields an implementation detail of a lower layer. The hardware abstraction layer is run in user space, and the kernel driver program is run in kernel space.

The libraries and runtime is also referred to as a runtime library, and provides a library file and an execution environment that are required when an executable program is run. In an embodiment, the libraries and runtime include Android runtime (ART), a library, and a scene package runtime. The ART is a virtual machine or a virtual machine instance that can convert bytecode of an application into machine code. The library is a program library that provides support to the executable program during running, and includes a browser engine (for example, a webkit), a script execution engine (for example, a JavaScript engine), a graphics processing engine, and the like. The scene package runtime is a running environment of a scene package, and mainly includes a page execution environment (page context) and a script execution environment (script context). The page execution environment invokes a corresponding library to parse page code in an HTML, CSS, or another format, and the script execution environment invokes a corresponding function library to parse and execute code or an executable file implemented by a script language such as JavaScript.

The framework is configured to provide various basic common components and services such as window management and location management for the application program in the application layer. In an embodiment, the framework includes a geofencing service, a policy service, a notification manager, and the like.

All functions of the components in the operating system 911 described above may be implemented by the application processor 901 by executing the program stored in the memory 903.

One of ordinary skilled in the art may understand that the terminal device 900 may include fewer or more components than those shown in FIG. 9, and the terminal device shown in FIG. 9 includes only components more related to a plurality of implementations disclosed in this application.

As described above, a panoramic video may provide content of a horizontal 360-degree and vertical 180-degree spherical scene. A user watches the panoramic video, and uses a head of the user as a central point. The head of the user may rotate horizontally around 360 degrees and tilt up/down around 180 degrees. Therefore, a visible range of the user may reach horizontal 360 degrees and vertical 180 degrees. It can be learned that, if the panoramic video is simulated as a spherical surface of a sphere, a complete panoramic video can be viewed by rotating and/or tilting up/down the head, provided that the head of the user only needs to be located at a center of sphere location of the sphere.

Therefore, a panoramic video three-dimensional spherical representation panoramic image of the user may be virtualized based on a plurality of frames of three-dimensional (3D) panoramic images included in the panoramic video. Any point in the panoramic video three-dimensional spherical representation panoramic image may be represented by using spherical coordinates, and for any pixel in the 3D panoramic image, a corresponding point may be found in the panoramic video three-dimensional spherical representation panoramic image. The point may be referred to as a mapping point of the any pixel.

Because the three-dimensional (3D) panoramic image in a spherical format cannot be conveniently represented, stored, and indexed, in a conventional technology, the 3D panoramic image is usually unfolded into a plane, to obtain a two-dimensional (2D) panoramic image (in this application, the 2D panoramic image may be referred to as a panoramic video two-dimensional planar projection), and then the 2D panoramic image is compressed, processed, stored, transmitted, and the like. An operation of unfolding the 3D panoramic image to obtain the 2D panoramic image is referred to as mapping. Currently, there are a plurality of mapping methods. Correspondingly, there are a plurality of 2D panoramic image formats.

Figure 10A:
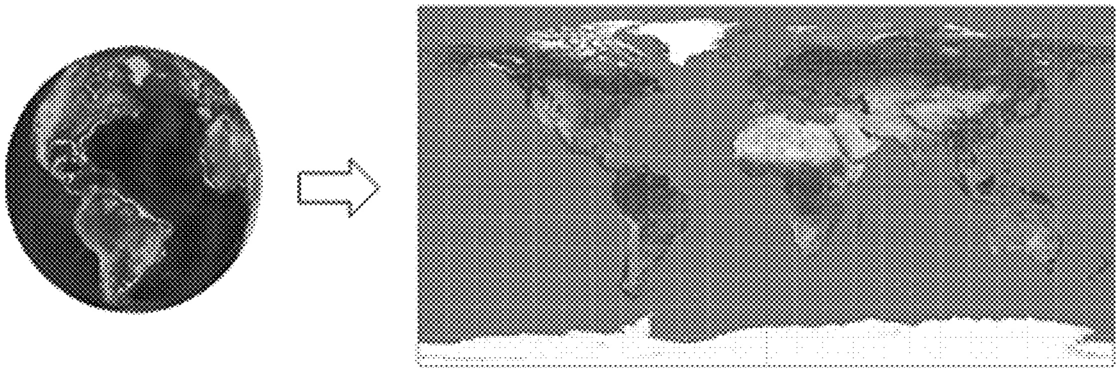
FIG. 10*a* is an example diagram of mapping onto a longitude and latitude map.

1. A most common 2D panoramic image format is referred to as a longitude and latitude map. As shown in FIG. 10*a*, content is that a 3D panoramic image of the earth is unfolded into a 2D panoramic image, and an image of a region adjacent to the north/south pole is obtained through stretching, and severe distortion and data redundancy exist.

2. To reduce strong distortion in the longitude and latitude map, the 3D panoramic image may be projected onto a surface of a regular polyhedron, so that a spherical surface is represented as a polyhedron including several equal-size triangular surfaces, square surfaces, pentagonal surfaces, or the like, for example, a regular tetrahedron (as shown in (a) in FIG. 10*b*), a regular hexahedron (as shown in (b) in FIG. 10*b*), a regular octahedron (as shown in (c) in FIG. 10*b*), a regular dodecahedron (as shown in (d) in FIG. 10*b*), or a regular icosahedron (as shown in (e) in FIG. 10*b*). It should be noted that, a polyhedron is not limited to the regular polyhedron in this application, and the spherical surface may also be represented as a polyhedron including several unequal-size polygons.

Figure 10B:
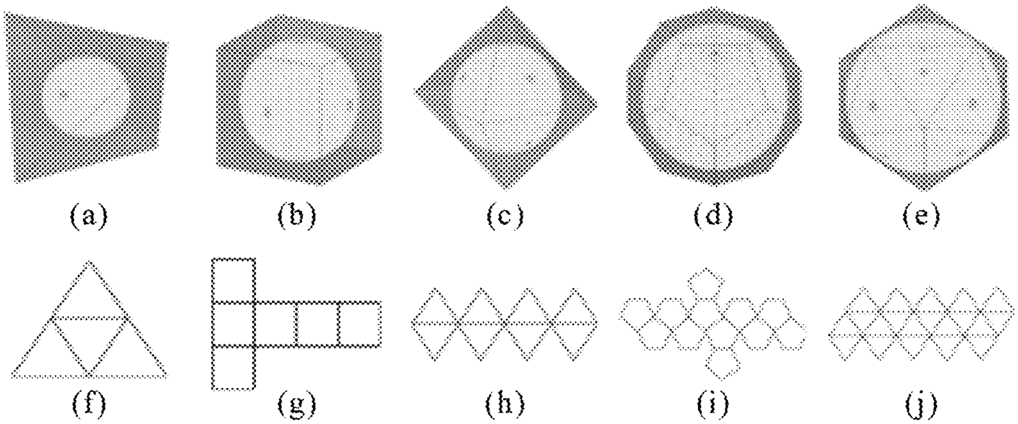
FIG. 10*b* is a schematic diagram of mapping a spherical surface onto a regular polyhedron and a corresponding unfolded image.

Then, the polyhedron is unfolded into the 2D panoramic image. (a) in FIG. 10*b* is unfolded into a 2D panoramic image shown in (f) in FIG. 10*b*, (b) in FIG. 10*b* is unfolded into a 2D panoramic image shown in (g) in FIG. 10*b*, (c) in FIG. 10*b* is unfolded into a 2D panoramic image shown in (h) in FIG. 10*b*, (d) in FIG. 10*b* is unfolded into a 2D panoramic image shown in (i) in FIG. 10*b*, and (e) in FIG. 10*b* is unfolded into a 2D panoramic image shown in (j) in FIG. 10*b*. These 2D panoramic images may be collectively referred to as panoramic images in a polyhedron format.

A projection process is as follows: The sphere is placed in the polyhedron, so that the sphere becomes an inscribed sphere of the polyhedron. The center of sphere (or a polyhedron center) is connected to a point on the spherical surface, and a connecting line is extended, and intersects a surface of the polyhedron. A pixel value at a location of the point on the spherical surface is a pixel value at a location of an intersection point on the surface of the polyhedron. Pixel values of all pixel locations on the polyhedron may be obtained with reference to an interpolation method. In addition, to obtain a pixel value of a pixel location on the polyhedron, the pixel may be directly connected to the center of sphere, and a line intersects a point on the spherical surface, and a pixel value of an intersection point on the spherical surface is used as a pixel value of the location of the point.

Figure 10C:
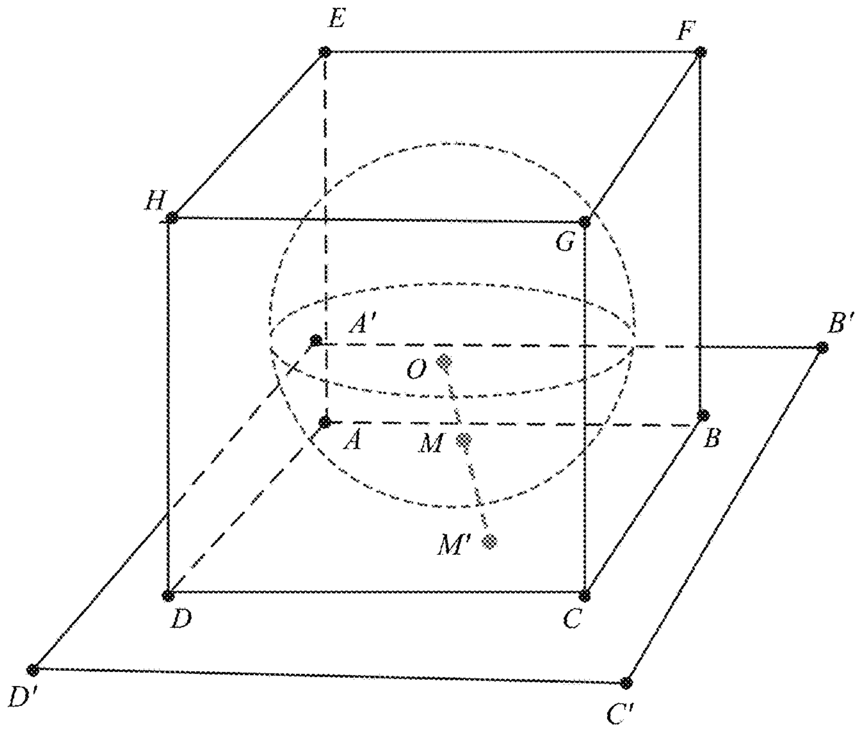
FIG. 10*c* and FIG. 10*d* each are a schematic diagram of a mapping relationship between a spherical surface and a hexahedron.

A hexahedron projection process is used as an example. The spherical surface is internally tangent to a hexahedron ABCDEFGH shown in FIG. 10*c*. To obtain a pixel value at a location of a point M' on the polyhedron, a center of sphere O is connected to the point M', and a line intersects a point M on the spherical surface. In this case, a pixel value at the point M is a pixel value at the point M'. In this method, pixel values of all pixel locations on a face ABCD on a plane A'B'C'D' can be obtained. Pixels on the face ABCD form a face image of the face (face) ABCD. The plane A'B'C'D' is referred to as a projection plane (projection plane) of the face ABCD. Similarly, a face image of another face of the hexahedron and a corresponding projection plane may be obtained. It should be noted that, the face image in this application is an N×N array including some spatially adjacent pixels. These pixels are located on a same projection plane in a process of mapping the spherical surface onto the surface of the polyhedron, and pixel values at locations of the pixels are known.

Figure 10D:
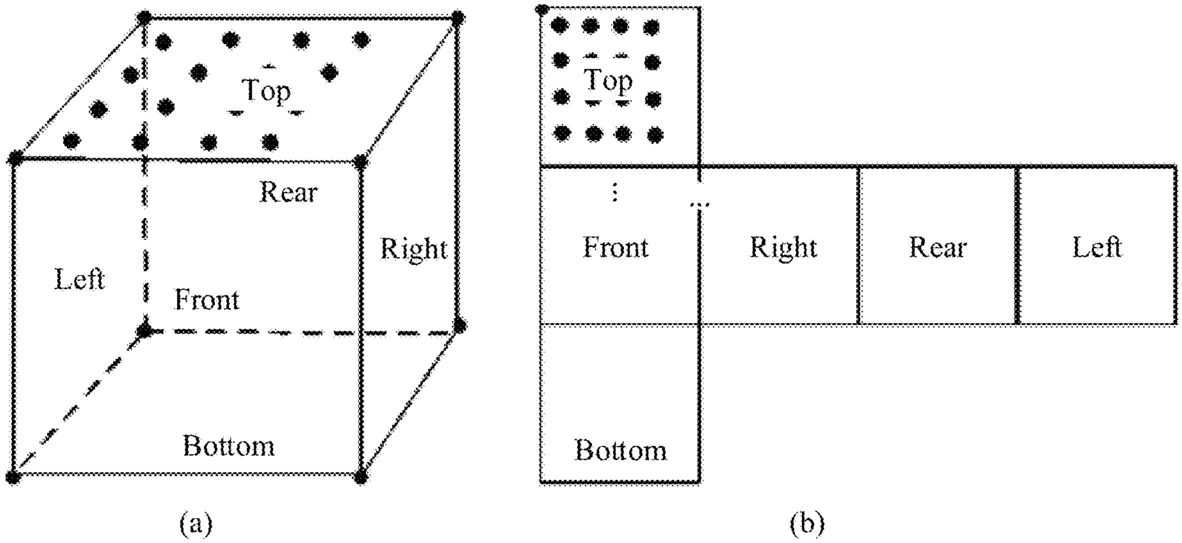

After the surface of the polyhedron is unfolded into the 2D panoramic image, each face image on the surface of the polyhedron becomes an image of a region in the 2D panoramic image or a sub-image of the 2D panoramic image. The face image of the surface of the polyhedron is used to represent the image of the region or the sub-image, and the surface of the polyhedron is used to represent a coverage region of the region in the 2D panoramic image or the sub-image. For example, a surface of the hexahedron in (a) in FIG. 10*d* is unfolded into a 2D panoramic image in (b) in FIG. 10*d*, and a face image of a top face on the surface of the hexahedron becomes a sub-image in an upper left corner in (b) in FIG. 10*d*. The sub-image is referred to as a face image of a top face of the 2D panoramic image, and the top face in the 2D panoramic image is a region covered by the face image of the top face. For any pixel on the top face, the top face is referred to as a face in which the pixel is located.

Figure 10E:
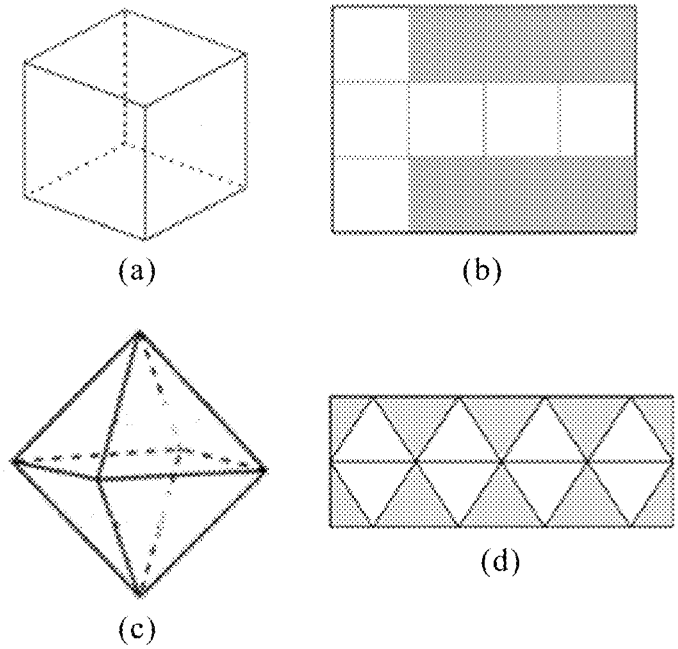
FIG. 10*e* is a schematic diagram of a mapping relationship between a spherical surface, a hexahedron, and an octahedron.

In image processing such as compression, the irregular 2D panoramic images shown in (f) to (j) in FIG. 10*b* may be directly processed, or a rectangular region that has a minimum area and that encloses the irregular 2D panoramic image may be selected as a processing object. A remaining part of the rectangular region other than the irregular 2D panoramic image may be filled with default content, for example, may be all gray, all black, or all white. For example, (b) in FIG. 10*e* is obtained by unfolding (a) in FIG. 10*e*, (d) in FIG. 10*e* is obtained by unfolding (c) in FIG. 10*e*, and a value of a pixel in the remaining part is set to a pixel value corresponding to gray. In addition, these faces may also be directly spliced into a regular rectangle, to avoid a filling operation. During actual encoding processing, a processed image is usually a rectangular image.

In the foregoing method or another method not listed in this application, the 3D panoramic image may be projected onto the panoramic video two-dimensional planar projection, and then the panoramic video two-dimensional planar projection is mapped onto a panoramic video three-dimensional spherical representation panoramic image. In other words, a plurality of pixels included in the panoramic video two-dimensional planar projection are respectively mapped onto the panoramic video three-dimensional spherical representation panoramic image, to obtain a plurality of mapping points, and processing of the panoramic video two-dimensional planar projection is converted into processing of the panoramic video three-dimensional spherical representation panoramic image. It can be learned that, a panoramic video two-dimensional planar projection represented in any format may be mapped onto the panoramic video three-dimensional spherical representation panoramic image. In this way, tone mapping of the panoramic image is no longer limited to a format of a 2D panoramic video.

In this application, the panoramic video three-dimensional spherical representation panoramic image may be segmented, to obtain a plurality of segmented regions. The plurality of segmented regions may be obtained in any one of the following manners:

1. The plurality of segmented regions are obtained by segmenting the panoramic video three-dimensional spherical representation panoramic image based on a preset angle of view separation rule.

Figure 11A:
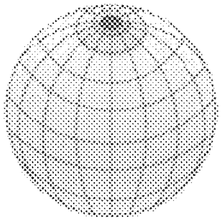
FIG. 11*a* to FIG. 11*d* each are an example schematic diagram of several segmented regions of a panoramic video three-dimensional spherical representation panoramic image according to an embodiment of the application.

In this application, the panoramic video three-dimensional spherical representation panoramic image may be segmented into a plurality of segmented regions separated by a preset angle of view. For example, as shown in FIG. 11*a*, in the plurality of segmented regions obtained through segmentation, horizontal included angles corresponding to two segmented regions with adjacent latitudes are equal, and tilting included angles corresponding to two segmented regions with adjacent longitudes are equal.

2. The plurality of segmented regions are obtained by segmenting the panoramic video three-dimensional spherical representation panoramic image in a latitude direction; and/or the plurality of segmented regions are obtained by segmenting the panoramic video three-dimensional spherical representation panoramic image in a longitude direction.

Figure 11B:
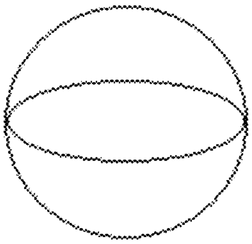
Figure 11C:
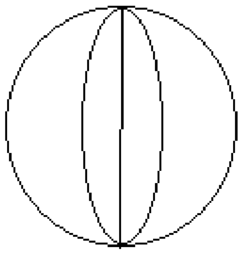
Figure 11D:
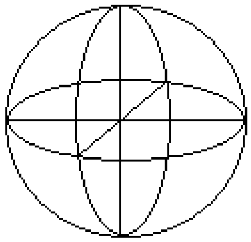

In this application, the panoramic video three-dimensional spherical representation panoramic image may be segmented into a plurality of segmented regions in the latitude direction. For example, as shown in FIG. 11*b*, the panoramic video three-dimensional spherical representation panoramic image is segmented into two upper and lower equal-size segmented regions. Alternatively, the panoramic video three-dimensional spherical representation panoramic image is evenly segmented into a plurality of segmented regions in the longitude direction. For example, as shown in FIG. 11*c*, the panoramic video three-dimensional spherical representation panoramic image is segmented into two left and right equal-size segmented regions. Alternatively, the panoramic video three-dimensional spherical representation panoramic image may be segmented into a plurality of segmented regions in the latitude direction, and the panoramic video three-dimensional spherical representation panoramic image may be evenly segmented into a plurality of segmented regions in the longitude direction. For example, as shown in FIG. 11*d*, the panoramic video three-dimensional spherical representation panoramic image is segmented into four upper, lower, left, and right equal-size segmented regions.

It should be understood that the several example segmentation manners do not constitute a limitation on a segmentation manner. Alternatively, the panoramic video three-dimensional spherical representation panoramic image may be segmented into two upper and lower equal-size parts, and then the two parts each are evenly quartered. Alternatively, the panoramic video three-dimensional spherical representation panoramic image may be segmented into two upper and lower equal-size parts, the two parts each are evenly quartered, and finally, each quartered region is segmented into regions separated by an equal angle of view. In addition, the panoramic video three-dimensional spherical representation panoramic image may not be equally segmented, or equal segmentation is not performed in all segmentation steps. This is not specifically limited in this application.

3. A plurality of pixels included in the panoramic image are clustered, to obtain a plurality of pixel sets, and the plurality of pixels are separately mapped onto the panoramic video three-dimensional spherical representation panoramic image. A region including a mapping point that corresponds to a pixel included in a first pixel set and that is in the panoramic video three-dimensional spherical representation panoramic image is used as a first segmented region. The first pixel set is one of the plurality of pixel sets, and the first segmented region is one of the plurality of segmented regions.

4. A plurality of pixels included in the panoramic image are separately mapped onto the panoramic video three-dimensional spherical representation panoramic image, to obtain a plurality of mapping points, and the plurality of mapping points are clustered, to obtain a plurality of mapping point sets. A region including a mapping point included in a first mapping point set is used as a second segmented region. The first mapping point set is one of the plurality of mapping point sets, and the second segmented region is one of the plurality of segmented regions.

Clustering methods includes:

a. The panoramic video three-dimensional spherical representation panoramic image is segmented, in a preset initial segmentation manner, into a plurality of segmented regions separated by an equal angle of view. It should be understood that the initial segmentation manner may further include any segmentation manner in 1 or 2. This is not specifically limited herein.

b. Mapping points respectively included in the plurality of segmented regions are determined. A plurality of mapping points in the panoramic video three-dimensional spherical representation panoramic image are obtained in the foregoing mapping process. A segmented region to which these mapping points belong may be determined based on spherical coordinates of the mapping points. Each of the plurality of segmented regions may include a mapping point, or some segmented regions may not include a mapping point.

c. A color component value of a mapping point at a central location of an $i^{th}$ segmented region or an average color component value of an $i^{th}$ segmented region is determined. The color component value may be at least one of components Y, U, and V in a color format YUV, or the color component value may be at least one of components R, G, and B and max(R, G, B) in a color format RBG, or the color component value may be at least one of L, a, and b in a color format Lab. The average color component value of the $i^{th}$ segmented region may be an average value of color component values of a plurality of mapping points included in the $i^{th}$ segmented region. The $i^{th}$ segmented region is one of the plurality of segmented regions. Herein, a processing process of the $i^{th}$ segmented region is used as an example to describe a processing process of each segmented region. It should be understood that, in this application, other feature information of the $i^{th}$ segmented region may be further obtained, for example, a color component value of a specified mapping point of the $i^{th}$ segmented region. This is not specifically limited herein. It should be noted that, if no mapping point is located at a central location in the $i^{th}$ segmented region, an average value avgx of x coordinates and an average value avgy of y coordinates of all mapping points in the $i^{th}$ segmented region may be calculated, and coordinates (avgx, avgy) are used to replace the mapping point at the central location.

d1. A clustering distortion value of another mapping point (a $j^{th}$ mapping point is used as an example below) in the $i^{th}$ segmented region and a mapping point at the central location in the $i^{th}$ segmented region is calculated:

$$D_j=\text{Normalize}(Q_c-Q_j)+\text{Normalize}(\sqrt{2(x_j-x_c)^2+(y_j-y_c)^2+(z_j-z_c)^2})$$

Herein, $D_j$ represents a clustering distortion value of the $j^{th}$ mapping point, $Q_c$ represents a color component value of the mapping point at the central location in the $i^{th}$ segmented region, $Q_j$ represents a color component value of the $j^{th}$ mapping point, $(X_c, y_c, z_c)$ represents coordinates of the mapping point at the central location in the $i^{th}$ segmented region, and $(x_j, y_j, z_j)$ represents coordinates of the $j^{th}$ mapping point. $(Q_c-Q_j)$ may be normalized based on a maximum value range of $Q_c$ and $Q_j$, and is normalized to a value between 0 and 1.0. $(\sqrt{2(x_j-x_c)^2+(y_j-y_c)^2+(z_j-z_c)^2})$ is normalized based on an average area of the segmented regions (which is obtained by segmenting an area of the spherical surface by a quantity of segmented regions). Assuming that the segmented region is a circle or square, a radius (corresponding to the circular segmented region) or a side length (corresponding to the square segmented region) of the segmented region may be estimated. A calculated Euclidean distance is divided by the radius or the square length of the square, a value greater than 1 is set to 1, to normalize the value to a value between 0 and 1.0.

d2. A clustering distortion value of another mapping point (a $j^{th}$ mapping point is used as an example below) in the $i^{th}$ segmented region and a mapping point at a central location in the $i^{th}$ segmented region is calculated:

$$D_j=\text{Normalize}(Q_c-Q_j)+\text{Normalize}(\sqrt{2(x_j-x_c)^2+(y_j-y_c)^2+(z_j-z_c)^2})$$

Herein, $D_j$ represents a clustering distortion value of the $j^{th}$ mapping point, $Qa_c$ represents an average color component value of the $i^{th}$ segmented region, $Q_j$ represents a color component value of the $j^{th}$ mapping point, $(x_c, y_c, z_c)$ represents coordinates of a mapping point at the central location in the $i^{th}$ segmented region, and $(x_j, y_j, z_j)$ represents coordinates of the $j^{th}$ mapping point.

d1 and d2 are alternative steps.

e. A segmented region to which a plurality of mapping points included in the $i^{th}$ segmented region belong is determined based on a clustering distortion value of the plurality of mapping points. For example, if a clustering distortion value $D_j$ of the $j^{th}$ mapping point is less than or equal to a preset threshold, it is determined that the $j^{th}$ mapping point belongs to the $i^{th}$ segmented region; or if a clustering distortion value $D_j$ of the $j^{th}$ mapping point is greater than a preset threshold, it is determined that the $j^{th}$ mapping point does not belong to the $i^{th}$ segmented region. Further, the clustering distortion value of the $j^{th}$ mapping point is calculated again in the methods in d1 and d2. A difference lies in that the mapping point at the central location in the $i^{th}$ segmented region is replaced with a mapping point at a central location in an adjacent segmented region of the $i^{th}$ segmented region, and then whether the $j^{th}$ mapping point belongs to the adjacent segmented region is determined based on the re-obtained clustering distortion value, and so on, until the segmented region to which the $j^{th}$ mapping point belongs is determined.

f. After segmented regions to which all the mapping points belong are determined by using the foregoing steps, a region including a plurality of mapping points (the plurality of mapping points form one of the foregoing mapping point sets) that belong to a same segmented region (for example, the $i^{th}$ segmented region) after clustering may be a final segmented region.

A difference between the segmentation manner 3 and the segmentation manner 4 lies in that, in the segmentation manner 3, the plurality of pixels included in the panoramic image are clustered in the foregoing clustering methods, to obtain the plurality of pixel sets, and then the pixels are mapped onto the panoramic video three-dimensional spherical representation panoramic image. A region including mapping points corresponding to pixels included in a pixel set is the final segmented region.

It should be understood that, in addition to the foregoing four segmentation manners, another segmentation manner may be further used. This is not specifically limited in this application.

Figure 12:
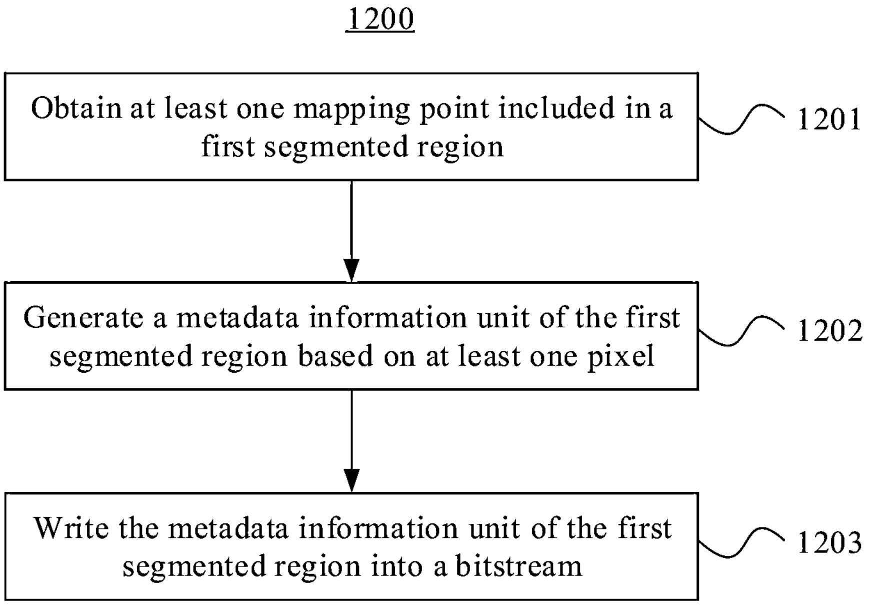
FIG. 12 is a flowchart of a process 1200 of a tone mapping method for a panoramic image according to an embodiment of the application.

FIG. 12 is a flowchart of a process 1200 of a tone mapping method for a panoramic image according to this application. The process 1200 may be performed by a front end in the panoramic video playing system shown in FIG. 8. The process 1200 is described as a series of steps or operations. It should be understood that the process 1200 may be performed in various sequences and/or simultaneously, and is not limited to an execution sequence shown in FIG. 12. The process 1200 may include the following operations.

Operation 1201: Obtain at least one mapping point included in a first segmented region.

In this application, the front end may segment a panoramic video three-dimensional spherical representation panoramic image in the foregoing manner, to obtain a plurality of segmented regions. For a to-be-used segmentation manner, the front end may use a preset segmentation manner. For example, it is preset that the first segmentation manner is used, and the front end may segment the panoramic video three-dimensional spherical representation panoramic image into a plurality of segmented regions separated by an equal angle of view. In this case, the preset segmentation manner may be applied to most panoramic images, to improve image processing efficiency. Alternatively, the front end may use a segmentation manner determined based on a preset rule. For example, after obtaining the to-be-processed panoramic image, the front end may perform feature analysis on the panoramic image, to determine the segmentation manner. The segmentation manner better conforms to a feature of the panoramic image, to improve image processing efficiency. Alternatively, the front end may provide a user selection interface, and a user selects or inputs, on the interface, a segmentation manner expected to be used. In this way, the segmentation manner can better conform to a dynamic range of the panoramic image.

It should be understood that, in addition to the foregoing three methods for determining the segmentation manner, the segmentation manner may be determined in another method. This is not specifically limited in this application.

The first segmented region is one of the plurality of segmented regions obtained by segmenting the panoramic video three-dimensional spherical representation panoramic image by the front end. A plurality of pixels included in the panoramic image may be separately mapped onto the panoramic video three-dimensional spherical representation panoramic image based on a mapping relationship between the panoramic image and the panoramic video three-dimensional spherical representation panoramic image, to obtain a plurality of mapping points. The plurality of pixels are in a one-to-one correspondence with the plurality of mapping points. Based on this, at least one mapping point included in the first segmented region may be obtained after a range of the first segmented region is determined.

Operation 1202: Generate a metadata information unit of the first segmented region based on at least one pixel.

Usually, panoramic video data includes video data and metadata information. The video data may be related data of a plurality of image frames included in a panoramic video, for example, pixel data of each image frame. The metadata information may include data related to the video data and data related to a mapping curve. The data related to the video data may include, for example, a format and a feature of the panoramic video data, targeted system display maximum luminance, and maximum luminance MaxSource, minimum luminance MinSource, and average luminance AvgSource that are of the panoramic video and that can be stored in a memory, and a change range that can be stored. A principle of the change range that can be stored is similar to a variance or a distribution confidence interval, and is used to describe a luminance aggregation range of a video signal. For example, the data related to the mapping curve may include parameters related to the mapping curve such as a shrinkage factor, an offset factor, and a bending shape factor. For example, data related to an S-shaped curve includes eight parameters: a, b, p, n, m, $k_1$, $k_2$, and $k_3$. It should be noted that, the panoramic video data includes but is not limited to the foregoing content. This is not specifically limited in this application.

For example, an $i^{th}$ segmented region is used as an example for description.

1. "Maximum luminance value" in a metadata information unit is generated.

a. A luminance value Y[i] of a mapping point included in the $i^{th}$ segmented region is calculated (optionally, largest values of three components R, G, and B of the mapping point may also be calculated herein). Herein, $i \in [0, n-1]$, and n indicates a quantity of mapping points included in the $i^{th}$ segmented region. It should be noted that, the luminance value of the mapping point is actually a luminance value of a pixel corresponding to the mapping point in the panoramic image. The same is true below.

b. A maximum luminance value MaxY=max(Y[i]) in luminance values of mapping points included in the $i^{th}$ segmented region is obtained.

c. MaxY is adjusted based on a preset style or a parameter, to obtain MaxY1.

d. MaxY1 is written into a metadata information unit of the $i^{th}$ segmented region as "curve information value".

2. "Curve information value" in the metadata information unit is generated.

a. A histogram his[i] of all mapping points included in the $i^{th}$ segmented region is calculated. Herein, $i \in [0, n-1]$, and n indicates a quantity of mapping points included in the $i^{th}$ segmented region. It should be noted that, the histogram of all the mapping points is actually a histogram of a plurality of pixels corresponding to all the mapping points in the panoramic image. The same is true below.

b. The histogram his[i] (including performing no operation or truncating the histogram after the histogram exceeds a size) is processed, to generate his1[i].

c. The mapping curve Ratio[i]=his1[i]/Sum of (his1[i]) is generated based on the processed histogram his1[i].

d. Ratio[i] is adjusted based on a preset style or algorithm parameter, to obtain Ratio1[i]=w[i]×Ratio[i].

e. Ratio1[n] is written into the metadata information unit of the $i^{th}$ segmented region as "curve information value".

In an embodiment, when histograms and/or luminance of the first segmented region and a second segmented region meet/meets a specified condition, the front end merges the metadata information unit of the first segmented region and a second metadata information unit of the second segmented region, to obtain a metadata information unit of the first segmented region and the second segmented region. The second segmented region is one of the plurality of segmented regions.

It should be understood that the foregoing provides example descriptions of two methods for generating content in the metadata information unit, but does not constitute a limitation on a manner of generating the metadata information unit and content included in the metadata information unit. This is not specifically limited in this application.

The front end obtains histograms and/or luminance values of the plurality of segmented regions. If histograms and/or luminance values of at least two segmented regions are similar, for example, a distortion value of the histograms and/or the luminance values of the at least two segmented regions is less than a specified threshold, it may be considered that a dynamic range similarity of image regions corresponding to the at least two segmented regions is high. Therefore, a same metadata information unit may be determined for the at least two segmented regions. The metadata information unit may be obtained by performing weighted averaging on respective metadata information units of the at least two segmented regions obtained in the foregoing steps, or the at least two segmented regions obtained in the foregoing steps are used as one segmented region to recalculate the metadata information unit.

For example, whether a distortion value of the histograms of the at least two segmented regions is less than the specified threshold may be determined in the following method:

1. A histogram hisA[n] of all mapping points included in the first segmented region is calculated.

2. A histogram hisB[n] of all mapping points included in the second segmented region is calculated.

3. $hisDiff[i]=(hisA[i]-hisB[i])\times(hisA[i]-hisB[i])$ is calculated.

4. A total distortion value $hisDiffSum=\Sigma hisDiff[i]\times w[i]$ is calculated based on a preset weight.

5. If hisDiffSum is less than a preset threshold T, it is considered that "the histograms of the first segmented region and the second segmented region meet the specified condition".

In this case, the front end may add indication information to the metadata information unit, to indicate a segmented region corresponding to the metadata information unit. For example, a plurality of spherical coordinates are written into the metadata information unit, and the plurality of spherical coordinates are located in the two segmented regions. In this way, when reading the metadata information unit, a display end determines, based on the spherical coordinates included in the metadata information unit, a segmented region to which the spherical coordinates belong, to determine the segmented region as the segmented region corresponding to the metadata information unit.

It can be learned that when generating a metadata information unit of each segmented region, the front end fully considers a feature of a pixel corresponding to a mapping point included in the segmented region. The feature of the pixel may reflect a dynamic range of the segmented region. Therefore, when obtaining, based on the metadata information unit, a tone mapping curve of a segmented region corresponding to the metadata information unit, the display end obtains a tone mapping curve that matches a feature of the dynamic range of the segmented region, to implement more accurate tone mapping processing for the panoramic image.

Operation 1203: Write the metadata information unit of the first segmented region into a bitstream.

After determining the first segmented region and the metadata information unit corresponding to the first segmented region, the front end may write the metadata information unit into the bitstream, so that the display end performs corresponding tone mapping when displaying the panoramic image. It should be understood that, a corresponding metadata unit of a segmented region in the plurality of segmented regions other than the first segmented region may be determined in the foregoing method. Details are not described herein again.

In an embodiment, the front end may traverse the plurality of segmented regions in a specified sequence, and then write a metadata information unit corresponding to each segmented region into the bitstream each time the segmented region is traversed.

In an embodiment, the front end may determine, based on a preset rule, a sequence of traversing the plurality of segmented regions, and then write a metadata information unit corresponding to the segmented region into the bitstream each time the segmented region is traversed in the sequence. In this case, the front end further needs to write the determined sequence into the bitstream.

The sequence may be a top-down sequence, or a front-back sequence, or the like of the panoramic video three-dimensional spherical representation panoramic image.

In an embodiment, the front end may cross-perform a process of generating the metadata information unit and a process of writing the bitstream. In other words, the front end traverses a plurality of segmented regions in the foregoing sequence, generates a metadata information unit corresponding to a segmented region in the method in operation 1202 each time the segmented region is traversed, and then writes the metadata information unit into the bitstream.

In this application, a panoramic video three-dimensional spherical representation panoramic image corresponding to the panoramic image is segmented into a plurality of segmented regions, and a metadata information unit of the segmented region is generated based on a pixel corresponding to a mapping point included in each segmented region, so that the metadata information unit is used to guide a display end to generate a tone mapping curve corresponding to the segmented region, to implement tone mapping from the image to displaying. In this way, a matched tone mapping parameter can be determined for different dynamic range regions of the panoramic image, and a display dynamic range of the display end can be met, to improve panoramic image processing efficiency.

Figure 13:
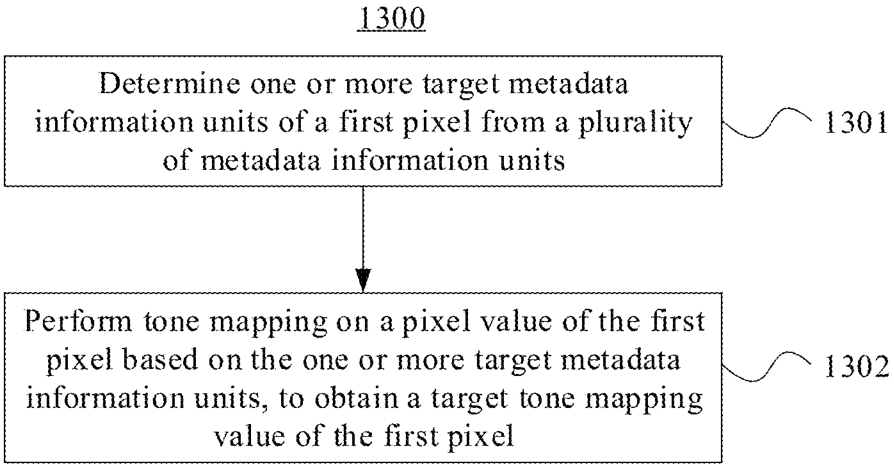
FIG. 13 is a flowchart of a process 1300 of a tone mapping method for a panoramic image according to an embodiment of the application.

FIG. 13 is a flowchart of a process 1300 of a tone mapping method for a panoramic image according to this application. The process 1300 may be performed by a display end in the panoramic video playing system shown in FIG. 8. The process 1300 is described as a series of steps or operations. It should be understood that the process 1300 may be performed in various sequences and/or simultaneously, and is not limited to an execution sequence shown in FIG. 13. The process 1300 may include the following operations.

Operation 1301: Determine one or more target metadata information units of a first pixel from a plurality of metadata information units.

In this application, the display end may segment a panoramic video three-dimensional spherical representation panoramic image in the foregoing manner, to obtain a plurality of segmented regions. For a to-be-used segmentation manner to be used, the display end may use a preset segmentation manner, or may use a segmentation manner obtained by parsing a bitstream.

It should be understood that, in addition to the foregoing two methods for determining the segmentation manner, the segmentation manner may be determined in another method. This is not specifically limited in this application.

The display end may further parse the bitstream, to obtain the plurality of metadata information units. In addition, the display end may obtain number information of the plurality of metadata information units from the bitstream through parsing. The number information may identify the plurality of metadata information units, and may further indicate a sequence of the plurality of metadata information units. Alternatively, the display end may determine a sequence of parsing out the plurality of metadata information units as a sequence of the plurality of metadata information units.

The display end may determine a correspondence between a plurality of segmented regions and a plurality of metadata information units in the following methods:

1. The display end may extract a current metadata information unit from the plurality of metadata information units in a first preset sequence; extract a current segmented region from the plurality of segmented regions in a second preset sequence; and establish a correspondence between the current segmented region and the current metadata information unit.

2. The display end may extract a current metadata information unit from the plurality of metadata information units in a first preset sequence; extract a current segmented region from the plurality of segmented regions in a traversing sequence obtained by parsing the bitstream; and establish a correspondence between the current segmented region and the current metadata information unit.

3. The display end may extract a current metadata information unit from the plurality of metadata information units in a first preset sequence; obtain one or more coordinates included in the current metadata information unit; and determine one or more mapping points in the panoramic video three-dimensional spherical representation panoramic image based on the one or more coordinates. When there is only one mapping point, a correspondence between the current metadata information unit and a segmented region to which the one mapping point belongs is established; or when there are a plurality of mapping points, a correspondence between the current metadata information unit and at least one segmented region to which the plurality of mapping points belong is established.

The current metadata information unit may be considered to be ranked the first in the plurality of metadata information units. As described above, the plurality of metadata information units have a sequence. The first preset sequence may be that a metadata information unit ranked the first is extracted based on the sequence of the plurality of metadata information units, and is used as the current metadata information unit. Once a correspondence between the current metadata information unit and one or more segmentation units is determined, the current metadata information unit is removed from the first ranking, a next metadata information unit is determined as a new current metadata information unit, and iteration is performed for a plurality of times, until the correspondence between a plurality of segmented regions and a plurality of metadata information units is determined.

In this application, the display end may determine one or more target segmented regions based on a specified mapping point; and when there is only one target segmented region, determine a metadata information unit corresponding to the one target segmented region as the one target metadata information unit; or when there are a plurality of target segmented regions, determine metadata information units respectively corresponding to the plurality of target segmented regions as the plurality of target metadata information units.

In an embodiment, the specified mapping point is the first mapping point, and a first coverage area is determined in the panoramic video three-dimensional spherical representation panoramic image by using the first mapping point as a center; and when the first coverage area includes one segmented region, the one segmented region is determined as one target segmented region; or when the first coverage area includes a plurality of segmented regions, the plurality of segmented regions are determined as a plurality of target segmented regions.

The specified mapping point is the first mapping point of the first pixel in the panoramic video three-dimensional spherical representation panoramic image. The display end may determine the first coverage area by using the first mapping point as a center of a circle and using a first length as a radius. In this case, the first coverage area is a circular region. Alternatively, the display end may determine the first coverage area by using the first mapping point as a center and using a first length as a side length. In this case, the first coverage area is a square region. The first length may be a preset length, or the first length may be specified in a first metadata information unit corresponding to a first segmented region to which the first mapping point belongs. The plurality of segmented regions include the first segmented region, and the plurality of metadata information units include the first metadata information unit. It should be understood that, the first coverage area may alternatively be a region of another shape, and related information about a shape and a size of the first coverage area may be preset, or may be specified in the first metadata information unit. This is not specifically limited in this application.

For example, the first coverage area determined by using the first mapping point as a center and using the first length as a radius/side length may cover only a segmented region to which the first mapping point belongs. In this case, the segmented region to which the first mapping point belongs is a target segmented region. Alternatively, the first coverage area may cover a segmented region to which the first mapping point belongs and one or more segmented regions adjacent to the segmented region. In this case, the segmented region to which the first mapping point belongs and the one or more segmented regions adjacent to the segmented region are a plurality of target segmented regions. The first coverage area may cover only a partial region in the adjacent segmented region, and the adjacent segmented region may also be used as a target segmented region.

In an embodiment, the specified mapping point is a point of view center in the panoramic video three-dimensional spherical representation panoramic image, and a second segmented region to which the point of view center belongs is determined. The plurality of segmented regions include the second segmented region. The second segmented region is determined as one target segmented region.

The specified mapping point is the point of view center in the panoramic video three-dimensional spherical representation panoramic image. Regardless of a location of the first pixel in the panoramic image, a second segmented region to which the point of view center belongs may be determined as a target segmented region with reference to the point of view center in the panoramic video three-dimensional spherical representation panoramic image.

In an embodiment, the specified mapping point is a point of view center in the panoramic video three-dimensional spherical representation panoramic image, and a second coverage area is determined in the panoramic video three-dimensional spherical representation panoramic image by using the point of view center as a center; and when the second coverage area includes one segmented region, the one segmented region is determined as one target segmented region; or when the second coverage area includes a plurality of segmented regions, the plurality of segmented regions are determined as a plurality of target segmented regions.

The specified mapping point is a point of view center in the panoramic video three-dimensional spherical representation panoramic image. The display end may determine the second coverage area by using the point of view center as a center and using a second length as a radius/side length. In this case, the second coverage area is a circular region. Alternatively, the display end may determine the second coverage area by using the point of view center as a center and using a second length as a side length. In this case, the second coverage area is a square area. The second length may be a preset length, or the second length may be specified in a second metadata information unit corresponding to a second segmented region to which the point of view center belongs. The plurality of segmented regions include the second segmented region, and the plurality of metadata information units include the second metadata information unit. It should be understood that, the second coverage area may alternatively be a region of another shape, and related information about a shape and a size of the first coverage area may be preset, or may be specified in the second metadata information unit. This is not specifically limited in this application.

For example, different from a case in which the first coverage area is determined by using the first mapping point as a center of a circle and using the first length as a radius, the second coverage area is determined by using the point of view center as a center of a circle and using the second length as a radius, and then a segmented region covered by the second coverage area is determined as the target segmented region. Similarly, the second coverage area may cover only a segmented region to which the point of view center belongs. In this case, the segmented region to which the point of view center belongs is a target segmented region. Alternatively, the second coverage area may cover the segmented region to which the point of view center belongs and one or more segmented regions adjacent to the segmented region. In this case, the segmented region to which the point of view center belongs and the one or more segmented regions adjacent to the segmented region are a plurality of target segmented regions. The second coverage area may cover only a partial region in the adjacent segmented region, and the adjacent segmented region may also be used as a target segmented region.

Based on the correspondence between a plurality of segmented regions and a plurality of metadata information units, a metadata information unit corresponding to one or more target segmented regions determined in the foregoing step may be determined as the one or more target metadata information units of the first pixel.

Operation 1302: Perform tone mapping on a pixel value of the first pixel based on the one or more target metadata information units to obtain a target tone mapping value of the first pixel.

In this application, the display end may obtain one or more tone mapping curves based on the one or more target metadata information units. When there is only one tone mapping curve, tone mapping is performed on the pixel value of the first pixel based on the one tone mapping curve, to obtain the target tone mapping value; or when there are a plurality of tone mapping curves, tone mapping is separately performed on the pixel value of the first pixel based on the plurality of tone mapping curves, to obtain a plurality of tone median values of the first pixel; and the target tone mapping value is obtained based on the plurality of tone median values.

As described above, the metadata information unit includes a related parameter of the tone mapping curve. Therefore, a corresponding tone mapping curve may be obtained based on the parameter. It should be noted that, neither the parameter of the tone mapping curve nor the tone mapping curve is specifically limited in this application.

Based on this, if the first pixel has only one target metadata information unit, one tone mapping curve may be obtained for the first pixel; or if the first pixel has a plurality of target metadata information units, a plurality of tone mapping curves may be obtained for the first pixel.

Correspondingly, the target tone mapping value of the first pixel may be directly obtained by performing tone mapping on the pixel value of the first pixel based on the one tone mapping curve.

The plurality of tone median values of the first pixel may be obtained by separately performing tone mapping on the pixel value of the first pixel based on the plurality of tone mapping curves, and further processing is performed on the plurality of tone median values. For example, a median value in the plurality of tone median values (for example, the median value is 2 if the plurality of tone median values include 1, 2, and 3) is selected, or a result of performing weighted averaging processing on the plurality of tone median values is the target tone median value of the first pixel. A weighting coefficient corresponding to each tone median value in the foregoing weighted averaging may be related to a distance between the first mapping point and a central point of each segmented region. For example, a distance (for example, a Euclidean distance) between the first mapping point and a central point of each of the plurality of target segmented regions is calculated, a sum of distances corresponding to the plurality of target segmented regions is calculated, and a ratio of each distance to the sum of distances is used as a weighting coefficient of a tone median value obtained by a metadata information unit of a corresponding target segmented region. Alternatively, a weighting coefficient corresponding to each tone median value in the foregoing weighted averaging may be related to area proportions of segmented regions respectively corresponding to the plurality of target metadata information units. In other words, areas of a plurality of segmented regions included in the first coverage area or the second coverage area are calculated. If the segmented region is completely covered by the first coverage area or the second coverage area, a full area of the segmented region is calculated. If the segmented region is partially covered by the first coverage area or the second coverage area, an area of a partial region of the segmented region is calculated, a sum of areas of the plurality of target segmented regions is calculated, and a ratio of an area of each segmented region to the sum of the areas is used as the weighting coefficient of the tone median value obtained by the metadata information unit of the corresponding target segmented region.

For example, tone mapping curve parameters a, b, p, m, and n are obtained from the target metadata information unit of the first pixel, and the tone mapping curve may be obtained.

$$L' = F(L) = a\times\left(\frac{p\times L^n}{(p-1)\times L^n+1}\right)^m + b$$

A mapping relationship of mapping a normalized pixel value of the first pixel onto normalized HDR display data may be obtained based on the tone mapping curve. It should be noted that L and L' may be normalized optical signals or electrical signals. This is not specifically limited in this application. Normalization calculation may be normalizing nonlinear space of a PQ, or may be normalizing linear space of 0 to 1. Normalization may range from 0 nits to 10000 nits or may range from 0.001 nit to 100000 nits. A data normalization range and a data normalization process are not specifically limited in this application.

Normalized HDR display data L' is reversely normalized to a value between a maximum display capability and a minimum display capability of a display device based on the maximum display capability and the minimum display capability (usually 0) of the HDR display device, and the target tone value of the first pixel is reversely normalized HDR display data. It should be noted that reverse normalization calculation may be normalizing nonlinear space of a PQ, or may be normalizing linear space of 0 to 1. Reverse normalization may range from 0 nits to 10000 nits or may range from 0.001 nit to 100000 nits. A data reverse normalization range and a data normalization process are not limited in this application.

In this application, a panoramic video three-dimensional spherical representation panoramic image corresponding to the panoramic image is segmented into a plurality of segmented regions, and a metadata information unit of the segmented region is generated based on a pixel corresponding to a mapping point included in each segmented region, so that the metadata information unit is used to guide a display end to generate a tone mapping curve corresponding to the segmented region, to implement tone mapping from the image to a display. In this way, a matched tone mapping parameter can be determined for different dynamic range regions of the panoramic image, and a display dynamic range of the display end can be met, to improve panoramic image processing efficiency.

In an embodiment, the display end may parse the bitstream to obtain the plurality of metadata information units. In addition, the display end may obtain number information of the plurality of metadata information units from the bitstream through parsing. The number information may identify the plurality of metadata information units, and may further indicate a sequence of the plurality of metadata information units. Alternatively, the display end may parse the bitstream to obtain the plurality of metadata information units, and determine a sequence of parsing out the metadata information units as a sequence of the plurality of metadata information units.

In this application, the display end may segment the panoramic video three-dimensional spherical representation panoramic image, to obtain a plurality of segmented regions.

In an embodiment, the display end may obtain a preset segmentation manner, and then segment the panoramic video three-dimensional spherical representation panoramic image in the preset segmentation manner, to obtain the plurality of segmented regions.

A user may set a segmentation manner in advance based on historical data or laboratory data. In this way, the segmentation manner may be applied to most panoramic images, to improve image processing efficiency. Alternatively, a user may select or input, in a user interface provided by a panoramic image processing system, a segmentation manner expected to be used. In this way, the segmentation manner can better conform to a dynamic range of the panoramic image.

In an embodiment, the display end may parse the bitstream, to obtain the segmentation manner that is set by the front end.

After obtaining the to-be-processed panoramic image, the front end may perform feature analysis on the panoramic image, to determine the segmentation manner. The segmentation manner better conforms to a feature of the panoramic image, to improve image processing efficiency. To keep consistent with the display end, the front end may write the determined segmentation manner into the bitstream. The display end may obtain the foregoing segmentation manner after parsing the bitstream.

According to the foregoing method, the display end may determine that the segmentation manner is performing segmentation based on a field of view rule. The display end may segment the panoramic video three-dimensional spherical representation panoramic image into a plurality of segmented regions separated by an equal angle of view. For example, as shown in FIG. 12*a*, in the plurality of segmented regions obtained through segmentation, horizontal included angles corresponding to two segmented regions with adjacent latitudes are equal, and tilting included angles corresponding to two segmented regions with adjacent longitudes are equal. Alternatively, the display end may segment the panoramic video three-dimensional spherical representation panoramic image into a plurality of segmented regions in a latitude direction. For example, as shown in FIG. 12*b*, the display end segments the panoramic video three-dimensional spherical representation panoramic image into two upper and lower equal-size segmented regions. Alternatively, the display end evenly segments the panoramic video three-dimensional spherical representation panoramic image into a plurality of segmented regions in a longitude direction. For example, as shown in FIG. 12*c*, the display end segments the panoramic video three-dimensional spherical representation panoramic image into two left and right equal-size segmented regions. Alternatively, the display end may segment the panoramic video three-dimensional spherical representation panoramic image into a plurality of segmented regions in a latitude direction, and evenly segment the panoramic video three-dimensional spherical representation panoramic image into a plurality of segmented regions in a longitude direction. For example, as shown in FIG. 12*d*, the display end segments the panoramic video three-dimensional spherical representation panoramic image into four upper, lower, left, and right equal-size segmented regions.

It should be understood that the several example segmentation manners do not constitute a limitation on a segmentation manner. Alternatively, the display end may segment the panoramic video three-dimensional spherical representation panoramic image into two upper and lower equal-size parts, and then evenly quarter each of the two parts. Alternatively, the display end may segment the panoramic video three-dimensional spherical representation panoramic image into two upper and lower equal-size parts, evenly quarter each of the two parts, and finally, segment each quartered region into regions separated by an equal angle of view. In addition, the display end may not equally segment the panoramic video three-dimensional spherical representation panoramic image, or does not perform equal segmentation in all segmentation steps. This is not specifically limited in this application.

In this application, the display end may also parse the bitstream, to directly obtain the plurality of segmented regions included in the panoramic video three-dimensional spherical representation panoramic image. After segmenting the panoramic video three-dimensional spherical representation panoramic image to obtain the plurality of segmented regions, the front end may write segmentation information of the plurality of segmented regions into the bitstream, for example, a shape, a size, and coordinates of an upper left corner of the segmented region, for another example, description information of a segmentation line. In this way, the display end may parse the bitstream, to obtain segmentation information of the plurality of segmented regions, so as to determine the plurality of segmented regions.

Figure 14:
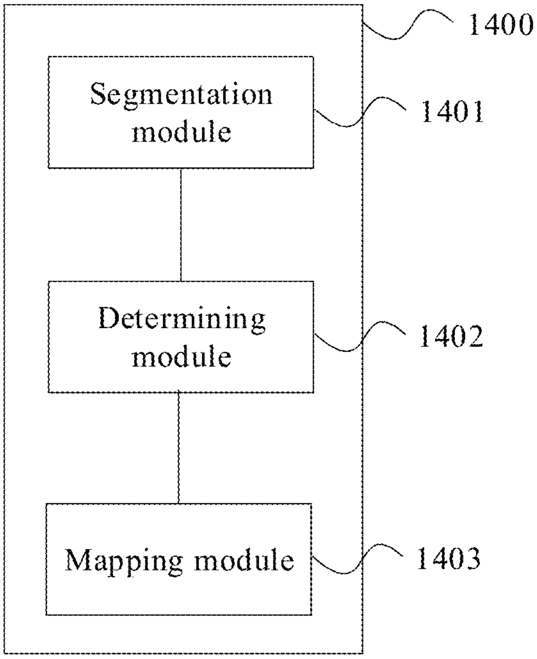
FIG. 14 is a diagram of an example structure of a display apparatus 1400 according to an embodiment of the application.

FIG. 14 is a diagram of an example structure of a display apparatus 1400 according to this application. As shown in FIG. 14, the display apparatus 1400 in this embodiment may be applied to the display end in the foregoing embodiments, or may be applied to the terminal device in the foregoing embodiments. The display apparatus 1400 may include a segmentation module 1401, a determining module 1402, and a mapping module 1403.

The determining module 1402 is configured to determine one or more target metadata information units of a first pixel from a plurality of metadata information units. The plurality of metadata information units are obtained by parsing a bitstream, the first pixel is any pixel in a to-be-processed panoramic video two-dimensional planar projection, the plurality of metadata information units correspond to a plurality of segmented regions included in a panoramic video three-dimensional spherical representation panoramic image, and there is a mapping relationship between the panoramic video two-dimensional planar projection and the panoramic video three-dimensional spherical representation panoramic image. The mapping module 1403 is configured to perform tone mapping on a pixel value of the first pixel based on the one or more target metadata information units to obtain a target tone mapping value of the first pixel.

In an embodiment, the segmentation module 1401 is configured to obtain the plurality of segmented regions.

In an embodiment, the segmentation module 1401 is configured to segment the panoramic video three-dimensional spherical representation panoramic image in a preset segmentation manner, to obtain the plurality of segmented regions.

In an embodiment, the segmentation module 1401 is configured to segment the panoramic video three-dimensional spherical representation panoramic image in a segmentation manner obtained by parsing the bitstream, to obtain the plurality of segmented regions.

In an embodiment, the plurality of segmented regions are obtained by segmenting the panoramic video three-dimensional spherical representation panoramic image based on a preset angle of view separation rule; or the plurality of segmented regions are obtained by segmenting the panoramic video three-dimensional spherical representation panoramic image in a latitude direction; and/or the plurality of segmented regions are obtained by segmenting the panoramic video three-dimensional spherical representation panoramic image in a longitude direction.

In an embodiment, the segmentation module 1401 is configured to: cluster a plurality of pixels included in the panoramic video two-dimensional planar projection, to obtain a plurality of pixel sets; separately map the plurality of pixels onto the panoramic video three-dimensional spherical representation panoramic image; and use, as a first segmented region, a region including a mapping point that corresponds to a pixel included in a first pixel set and that is in the panoramic video three-dimensional spherical representation panoramic image. The first pixel set is one of the plurality of pixel sets, and the first segmented region is one of the plurality of segmented regions.

In an embodiment, the segmentation module 1401 is configured to: separately map a plurality of pixels included in the panoramic video two-dimensional planar projection onto the panoramic video three-dimensional spherical representation panoramic image, to obtain a plurality of mapping points; cluster the plurality of mapping points, to obtain a plurality of mapping point sets; and use, as a second segmented region, a region including a mapping point included in a first mapping point set, where the first mapping point set is one of the plurality of mapping point sets, and the second segmented region is one of the plurality of segmented regions.

In an embodiment, the segmentation module 1401 is configured to obtain the plurality of segmented regions based on indication information of the plurality of segmented regions obtained by parsing the bitstream.

In an embodiment, the determining module 1402 is configured to: determine a correspondence between the plurality of metadata information units and the plurality of segmented regions, where one metadata information unit corresponds to one or more segmented regions; determine one or more target segmented regions based on a specified mapping point; and when there is only one target segmented region, determine a metadata information unit corresponding to the one target segmented region as the one target metadata information unit; or when there are a plurality of target segmented regions, determine metadata information units respectively corresponding to the plurality of target segmented regions as the plurality of target metadata information units.

In an embodiment, the determining module 1402 is configured to: extract a current metadata information unit from the plurality of metadata information units in a first preset sequence; extract a current segmented region from the plurality of segmented regions in a second preset sequence; and establish a correspondence between the current segmented region and the current metadata information unit.

In an embodiment, the determining module 1402 is configured to: extract a current metadata information unit from the plurality of metadata information units in a first preset sequence; extract a current segmented region from the plurality of segmented regions in a traversing sequence obtained by parsing the bitstream; and establish a correspondence between the current segmented region and the current metadata information unit.

In an embodiment, the determining module 1402 is configured to: extract a current metadata information unit from the plurality of metadata information units in a first preset sequence; obtain one or more coordinates included in the current metadata information unit; determine one or more mapping points in the panoramic video three-dimensional spherical representation panoramic image based on the one or more coordinates; and when there is only one mapping point, establish a correspondence between the current metadata information unit and a segmented region to which the one mapping point belongs; or when there are a plurality of mapping points, establish a correspondence between the current metadata information unit and at least one segmented region to which the plurality of mapping points belong.

In an embodiment, the specified mapping point is a first mapping point of the first pixel in the panoramic video three-dimensional spherical representation panoramic image, and the determining module 1402 is configured to: determine a first coverage area in the panoramic video three-dimensional spherical representation panoramic image by using the first mapping point as a center; and when the first coverage area includes one segmented region, determine the one segmented region as one target segmented region; or when the first coverage area includes a plurality of segmented regions, determine the plurality of segmented regions as a plurality of target segmented regions.

In an embodiment, the specified mapping point is a point of view center in the panoramic video three-dimensional spherical representation panoramic image, and the determining module 1402 is configured to: determine a second segmented region to which the point of view center belongs, where the plurality of segmented regions include the second segmented region; and determine the second segmented region as one target segmented region.

In an embodiment, the specified mapping point is a point of view center in the panoramic video three-dimensional spherical representation panoramic image, and the determining module 1402 is configured to: determine a second coverage area in the panoramic video three-dimensional spherical representation panoramic image by using the point of view center as a center; and when the second coverage area includes one segmented region, determine the one segmented region as the one target segmented region; or when the second coverage area includes a plurality of segmented regions, determine the plurality of segmented regions as a plurality of target segmented regions.

In an embodiment, the mapping module 1403 is configured to: obtain one or more tone mapping curves based on the one or more target metadata information units; when there is only one tone mapping curve, perform tone mapping on the pixel value of the first pixel based on the one tone mapping curve, to obtain the target tone mapping value; or when there are a plurality of tone mapping curves, separately perform tone mapping on the pixel value of the first pixel based on the plurality of tone mapping curves, to obtain a plurality of tone median values of the first pixel; and obtain the target tone mapping value based on the plurality of tone median values.

In an embodiment, the mapping module 1403 is configured to: determine a median value in the plurality of tone median values as the target tone mapping value; or perform weighted averaging on the plurality of tone median values, to obtain the target tone mapping value, where a weighting coefficient of the plurality of tone median values is preset, or a weighting coefficient of the plurality of tone median values is related to a distance between the first pixel and a central point of each segmented region, or a weighting coefficient of the plurality of tone median values is related to area proportions of segmented regions respectively corresponding to the plurality of target metadata information units.

The apparatus in this embodiment may be configured to perform the technical solutions in the method embodiment shown in FIG. 13. An implementation principle and technical effects of the apparatus are similar to those in the method embodiment. Details are not described herein again.

Figure 15:
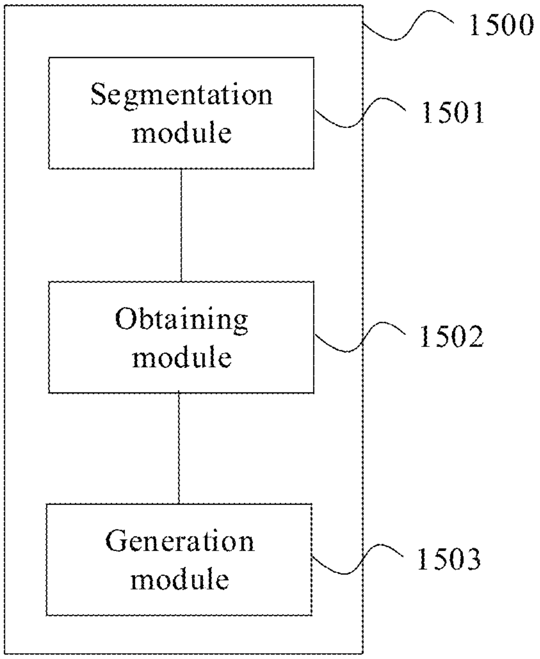
FIG. 15 is a diagram of an example structure of a front end apparatus 1500 according to an embodiment of the application.

FIG. 15 is a diagram of an example structure of a front end apparatus 1500 according to this application. As shown in FIG. 15, the front end apparatus 1500 in this embodiment may be applied to the front end in the foregoing embodiments, or may be applied to the terminal device in the foregoing embodiments. The front end apparatus 1500 may include a segmentation module 1501, an obtaining module 1502, and a generation module 1503.

The obtaining module 1502 is configured to obtain at least one mapping point included in a first segmented region. The first segmented region is one of a plurality of segmented regions included in a panoramic video three-dimensional spherical representation panoramic image, there is a mapping relationship between the panoramic video three-dimensional spherical representation panoramic image and a to-be-processed panoramic video two-dimensional planar projection, and the at least one mapping point corresponds to at least one pixel in the panoramic video two-dimensional planar projection. The generation module 1503 is configured to: generate a metadata information unit of the first segmented region based on the at least one pixel; and write the metadata information unit of the first segmented region into a bitstream.

In an embodiment, the generation module 1503 is further configured to: when histograms and/or luminance of the first segmented region and the second segmented region meet/meets a specified condition, merge a metadata information unit of the first segmented region and a second metadata information unit of the second segmented region, to obtain a metadata information unit of the first segmented region and the second segmented region, where the second segmented region is one of the plurality of segmented regions.

In an embodiment, the segmentation module 1501 is configured to: map the panoramic video two-dimensional planar projection onto the panoramic video three-dimensional spherical representation panoramic image; and segment the panoramic video three-dimensional spherical representation panoramic image, to obtain the plurality of segmented regions.

In an embodiment, the segmentation module 1501 is configured to segment the panoramic video three-dimensional spherical representation panoramic image in a preset segmentation manner, to obtain the plurality of segmented regions.

In an embodiment, the segmentation module 1501 is configured to segment the panoramic video three-dimensional spherical representation panoramic image in a segmentation manner determined based on a preset rule, to obtain the plurality of segmented regions.

In an embodiment, the plurality of segmented regions are obtained by segmenting the panoramic video three-dimensional spherical representation panoramic image based on a preset angle of view separation rule; or the plurality of segmented regions are obtained by segmenting the panoramic video three-dimensional spherical representation panoramic image in a latitude direction; and/or the plurality of segmented regions are obtained by segmenting the panoramic video three-dimensional spherical representation panoramic image in a longitude direction.

In an embodiment, the segmentation module 1501 is configured to: cluster a plurality of pixels included in the panoramic video two-dimensional planar projection, to obtain a plurality of pixel sets; separately map the plurality of pixels onto the panoramic video three-dimensional spherical representation panoramic image; and use, as a first segmented region, a region including a mapping point that corresponds to a pixel included in a first pixel set and that is in the panoramic video three-dimensional spherical representation panoramic image. The first pixel set is one of the plurality of pixel sets, and the first segmented region is one of the plurality of segmented regions.

In an embodiment, the segmentation module 1501 is configured to: separately map a plurality of pixels included in the panoramic video two-dimensional planar projection onto the panoramic video three-dimensional spherical representation panoramic image, to obtain a plurality of mapping points; cluster the plurality of mapping points, to obtain a plurality of mapping point sets; and use, as a second segmented region, a region including a mapping point included in a first mapping point set, where the first mapping point set is one of the plurality of mapping point sets, and the second segmented region is one of the plurality of segmented regions.

The apparatus in this embodiment may be configured to perform the technical solutions in the method embodiment shown in FIG. 12. An implementation principle and technical effects of the apparatus are similar to those in the method embodiment. Details are not described herein again.

In an embodiment, the operations in the method embodiments may be completed by using an integrated logical circuit of hardware in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The general-purpose processor may be a microprocessor, or the processor may be any conventional processor, or the like. The operations of the methods disclosed in embodiments of this application may be directly presented as being performed and completed by a hardware encoding processor, or performed and completed by a combination of hardware and a software module in an encoding processor. The software module may be located in a mature storage medium in the art such as a random access memory, a flash memory, a read-only memory, a programmable read-only memory, an electrically erasable programmable memory, or a register. The storage medium is located in the memory, and the processor reads information in the memory and completes the operations in the foregoing methods in combination with hardware of the processor.

The memory mentioned in the foregoing embodiments may be a volatile memory or a nonvolatile memory, or may include both a volatile memory and a nonvolatile memory. The nonvolatile memory may be a read-only memory (ROM), a programmable read-only memory (PROM), an erasable programmable read-only memory (erasable PROM, EPROM), an electrically erasable programmable read-only memory (electrically EPROM, EEPROM), or a flash memory. The volatile memory may be a random access memory (RAM), and is used as an external cache. Through examples but not limitative descriptions, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM). It should be noted that the memory in the system and methods described in this specification includes but is not limited to these memories and any memory of another proper type.

One of ordinary skilled in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. One of ordinary skilled in the art may use different methods to implement the described functions for each particular application, but it should not be considered that the implementation goes beyond the scope of this application.

One of ordinary skilled in the art may clearly understand that, for the purpose of convenient and brief description, for a detailed working process of the foregoing system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on a plurality of network units. Some or all of the units may be selected based on an actual requirement, to achieve the objectives of the solutions of embodiments.

In addition, functional units in the embodiments of the application may be integrated into one processing unit, each of the units may exist alone physically, or two or more units are integrated into one unit.

When the functions are implemented in a form of a software functional unit and sold or used as an independent product, the functions may be stored in a computer-readable storage medium. Based on such an understanding, technical solutions of this application essentially, or a part contributing to the conventional technology, or some of technical solutions may be implemented in a form of a software product. The computer software product is stored in a storage medium, and includes several instructions for instructing a computer device (a personal computer, a server, a network device, or the like) to perform all or some of the operations of the methods described in embodiments of this application. The foregoing storage medium includes any medium that can store program code such as a USB flash drive, a removable hard disk, a read-only memory (ROM), a random access memory (RAM), a magnetic disk, or an optical disc.

The foregoing descriptions are merely implementations of this application, but the protection scope of this application is not limited thereto. Any variation or replacement readily figured out by one of ordinary skilled in the art within the technical scope disclosed in this application shall fall within the protection scope of this application. Therefore, the protection scope of this application shall be subject to the protection scope of the claims.

What is claimed is:

1. A tone mapping method for a panoramic image, comprising:

determining one or more target metadata information units of a first pixel from a plurality of metadata information units obtained by parsing a bitstream, wherein the plurality of metadata information units corresponds to a plurality of segmented regions comprised in a panoramic video three-dimensional spherical representation panoramic image, the first pixel is any pixel in a panoramic video two-dimensional planar projection, the panoramic video three-dimensional spherical representation panoramic image has a mapping relationship with the panoramic video two-dimensional planar projection, a panoramic image is projected onto the panoramic video two-dimensional planar projection, and the panoramic video two-dimensional planar projection is mapped onto the three-dimensional spherical representation panoramic image; and performing tone mapping on a pixel value of the first pixel based on the one or more target metadata information units, to obtain a target tone mapping value of the first pixel.

2. The method according to claim 1, wherein before the determining the one or more target metadata information units of the first pixel from the plurality of metadata information units, the method further comprises:

segmenting the panoramic video three-dimensional spherical representation panoramic image in a preset segmentation manner, to obtain the plurality of segmented regions; or segmenting the panoramic video three-dimensional spherical representation panoramic image in a segmentation manner obtained by parsing the bitstream, to obtain the plurality of segmented regions; or obtaining the plurality of segmented regions based on indication information of the plurality of segmented regions obtained by parsing the bitstream.

3. The method according to claim 1, wherein the plurality of segmented regions are obtained by segmenting the panoramic video three-dimensional spherical representation panoramic image based on a preset angle of view separation rule; or the plurality of segmented regions are obtained by segmenting the panoramic video three-dimensional spherical representation panoramic image in a latitude direction; and/or the plurality of segmented regions are obtained by segmenting the panoramic video three-dimensional spherical representation panoramic image in a longitude direction.

4. The method according to claim 2, wherein the segmenting the panoramic video three-dimensional spherical representation panoramic image, to obtain the plurality of segmented regions comprises:

clustering a plurality of pixels comprised in the panoramic video two-dimensional planar projection, to obtain a plurality of pixel sets;

separately mapping the plurality of pixels onto the panoramic video three-dimensional spherical representation panoramic image; and using, as a first segmented region, a region comprising a mapping point that corresponds to a pixel comprised in a first pixel set in the panoramic video three-dimensional spherical representation panoramic image, wherein the first pixel set is one of the plurality of pixel sets, and the first segmented region is one of the plurality of segmented regions; or wherein the segmenting the panoramic video three-dimensional spherical representation panoramic image, to obtain the plurality of segmented regions comprises:

separately mapping a plurality of pixels comprised in the panoramic video two-dimensional planar projection onto the panoramic video three-dimensional spherical representation panoramic image, to obtain a plurality of mapping points;

clustering the plurality of mapping points, to obtain a plurality of mapping point sets; and using, as a second segmented region, a region comprising a mapping point comprised in a first mapping point set, wherein the first mapping point set is one of the plurality of mapping point sets, and the second segmented region is one of the plurality of segmented regions.

5. The method according to claim 1, wherein the determining the one or more target metadata information units of the first pixel from the plurality of metadata information units comprises:

determining a correspondence between the plurality of metadata information units and the plurality of segmented regions, wherein one metadata information unit corresponds to one or more segmented regions;

determining one or more target segmented regions based on a specified mapping point, wherein the specified mapping point is the first mapping point of the first pixel in the panoramic video three-dimensional spherical representation panoramic image; and when there is only one target segmented region, determining a metadata information unit corresponding to the one target segmented region as a target metadata information unit; or when there are a plurality of target segmented regions, determining metadata information units respectively corresponding to the plurality of target segmented regions as a plurality of target metadata information units.

6. The method according to claim 5, wherein the determining the correspondence between the plurality of metadata information units and the plurality of segmented regions comprises:

extracting a current metadata information unit from the plurality of metadata information units in a first preset sequence;

extracting a current segmented region from the plurality of segmented regions in a second preset sequence; and establishing a correspondence between the current segmented region and the current metadata information unit; or wherein the determining the correspondence between the plurality of metadata information units and the plurality of segmented regions comprises:

extracting a current metadata information unit from the plurality of metadata information units in the first preset sequence;

extracting a current segmented region from the plurality of segmented regions in a traversing sequence obtained by parsing the bitstream; and establishing a correspondence between the current segmented region and the current metadata information unit; or wherein the determining the correspondence between the plurality of metadata information units and the plurality of segmented regions comprises:

extracting a current metadata information unit from the plurality of metadata information units in the first preset sequence;

obtaining one or more coordinates comprised in the current metadata information unit;

determining one or more mapping points in the panoramic video three-dimensional spherical representation panoramic image based on the one or more coordinates; and when there is only one mapping point, establishing a correspondence between the current metadata information unit and a segmented region to which the one mapping point belongs; or when there are a plurality of mapping points, establishing a correspondence between the current metadata information unit and at least one segmented region to which the plurality of mapping points belong.

7. The method according to claim 1, wherein the performing tone mapping on the pixel value of the first pixel based on the one or more target metadata information units, to obtain the target tone mapping value of the first pixel comprises:

obtaining one or more tone mapping curves based on the one or more target metadata information units;

when there is only one tone mapping curve, performing tone mapping on the pixel value of the first pixel based on the one tone mapping curve, to obtain the target tone mapping value; or when there are a plurality of tone mapping curves, separately performing tone mapping on the pixel value of the first pixel based on the plurality of tone mapping curves, to obtain a plurality of tone median values of the first pixel; and obtaining the target tone mapping value based on the plurality of tone median values.

8. A tone mapping method for a panoramic image, comprising:

obtaining at least one mapping point comprised in a first segmented region that is one of a plurality of segmented regions comprised in a panoramic video three-dimensional spherical representation panoramic image having a mapping relationship with a panoramic video two-dimensional planar projection, wherein the at least one mapping point corresponds to at least one pixel in the panoramic video two-dimensional planar projection, a panoramic image is projected onto the panoramic video two-dimensional planar projection, and the panoramic video two-dimensional planar projection is mapped onto the three-dimensional spherical representation panoramic image;

generating a metadata information unit of the first segmented region based on the at least one pixel; and writing the metadata information unit of the first segmented region into a bitstream.

9. The method according to claim 8, wherein after the generating the metadata information unit of the first segmented region based on the at least one pixel, the method further comprises:

when histograms and/or luminance of the first segmented region and a second segmented region meet/meets a specified condition, merging a metadata information unit of the first segmented region and a second metadata information unit of the second segmented region, to obtain a metadata information unit of the first segmented region and the second segmented region, that is one of the plurality of segmented regions.

10. The method according to claim 8, wherein before the obtaining the at least one mapping point comprised in the first segmented region, the method further comprises:

mapping the panoramic video two-dimensional planar projection onto the panoramic video three-dimensional spherical representation panoramic image; and segmenting the panoramic video three-dimensional spherical representation panoramic image, to obtain the plurality of segmented regions.

11. The method according to claim 8, wherein the plurality of segmented regions are obtained by segmenting the panoramic video three-dimensional spherical representation panoramic image based on a preset angle of view separation rule; or the plurality of segmented regions are obtained by segmenting the panoramic video three-dimensional spherical representation panoramic image in a latitude direction; and/or the plurality of segmented regions are obtained by segmenting the panoramic video three-dimensional spherical representation panoramic image in a longitude direction.

12. The method according to claim 8, wherein the segmenting the panoramic video three-dimensional spherical representation panoramic image, to obtain the plurality of segmented regions comprises:

clustering a plurality of pixels comprised in the panoramic video two-dimensional planar projection, to obtain a plurality of pixel sets;

separately mapping the plurality of pixels onto the panoramic video three-dimensional spherical representation panoramic image; and using, as a first segmented region, a region comprising a mapping point that corresponds to a pixel comprised in a first pixel set in the panoramic video three-dimensional spherical representation panoramic image, wherein the first pixel set is one of the plurality of pixel sets, and the first segmented region is one of the plurality of segmented regions.

13. The method according to claim 8, wherein the segmenting the panoramic video three-dimensional spherical representation panoramic image, to obtain the plurality of segmented regions comprises:

separately mapping a plurality of pixels comprised in the panoramic video two-dimensional planar projection onto the panoramic video three-dimensional spherical representation panoramic image, to obtain a plurality of mapping points;

clustering the plurality of mapping points, to obtain a plurality of mapping point sets; and using, as a second segmented region, a region comprising a mapping point comprised in a first mapping point set, wherein the first mapping point set is one of the plurality of mapping point sets, and the second segmented region is one of the plurality of segmented regions.

14. A terminal device, comprising:

a processor; and a memory coupled to the processor to store instructions, which when executed by the processor, cause the processor to perform operations, the operations comprising:

determining one or more target metadata information units of a first pixel from a plurality of metadata information units obtained by parsing a bitstream, wherein the plurality of metadata information units correspond to a plurality of segmented regions comprised in a panoramic video three-dimensional spherical representation panoramic image, the first pixel is any pixel in a panoramic video two-dimensional planar projection, the panoramic video three-dimensional spherical representation panoramic image has a mapping relationship with the panoramic video two-dimensional planar projection, a panoramic image is projected onto the panoramic video two-dimensional planar projection, and the panoramic video two-dimensional planar projection is mapped onto the three-dimensional spherical representation panoramic image; and performing tone mapping on a pixel value of the first pixel based on the one or more target metadata information units, to obtain a target tone mapping value of the first pixel.

15. The terminal device of claim 14, wherein the operations further comprise:

segmenting the panoramic video three-dimensional spherical representation panoramic image in a preset segmentation manner, to obtain the plurality of segmented regions; or segmenting the panoramic video three-dimensional spherical representation panoramic image in a segmentation manner obtained by parsing the bitstream, to obtain the plurality of segmented regions; or obtaining the plurality of segmented regions based on indication information of the plurality of segmented regions obtained by parsing the bitstream.

16. The terminal device of claim 14, wherein the plurality of segmented regions are obtained by segmenting the panoramic video three-dimensional spherical representation panoramic image based on a preset angle of view separation rule; or the plurality of segmented regions are obtained by segmenting the panoramic video three-dimensional spherical representation panoramic image in a latitude direction; and/or the plurality of segmented regions are obtained by segmenting the panoramic video three-dimensional spherical representation panoramic image in a longitude direction.

17. The terminal device of claim 15, wherein the operations further comprise:

clustering a plurality of pixels comprised in the panoramic video two-dimensional planar projection, to obtain a plurality of pixel sets;

separately mapping the plurality of pixels onto the panoramic video three-dimensional spherical representation panoramic image; and using, as a first segmented region, a region comprising a mapping point that corresponds to a pixel comprised in a first pixel set in the panoramic video three-dimensional spherical representation panoramic image, wherein the first pixel set is one of the plurality of pixel sets, and the first segmented region is one of the plurality of segmented regions; or separately mapping a plurality of pixels comprised in the panoramic video two-dimensional planar projection onto the panoramic video three-dimensional spherical representation panoramic image, to obtain a plurality of mapping points;

clustering the plurality of mapping points, to obtain a plurality of mapping point sets; and using, as a second segmented region, a region comprising a mapping point comprised in a first mapping point set, wherein the first mapping point set is one of the plurality of mapping point sets, and the second segmented region is one of the plurality of segmented regions.

18. The terminal device of claim 14, wherein the operations further comprise:

determining a correspondence between the plurality of metadata information units and the plurality of segmented regions, wherein one metadata information unit corresponds to one or more segmented regions;

determining one or more target segmented regions based on a specified mapping point, wherein the specified mapping point is the first mapping point of the first pixel in the panoramic video three-dimensional spherical representation panoramic image; and when there is only one target segmented region, determining a metadata information unit corresponding to the one target segmented region as a target metadata information unit; or when there are a plurality of target segmented regions, determining metadata information units respectively corresponding to the plurality of target segmented regions as a plurality of target metadata information units.

19. The terminal device of claim 18, wherein the operations further comprise:

extracting a current metadata information unit from the plurality of metadata information units in a first preset sequence;

extracting a current segmented region from the plurality of segmented regions in a second preset sequence; and establishing a correspondence between the current segmented region and the current metadata information unit.

20. The terminal device of claim 14, wherein the operations further comprise:

obtaining one or more tone mapping curves based on the one or more target metadata information units;

when there is only one tone mapping curve, performing tone mapping on the pixel value of the first pixel based on the one tone mapping curve, to obtain the target tone mapping value; or when there are a plurality of tone mapping curves, separately performing tone mapping on the pixel value of the first pixel based on the plurality of tone mapping curves, to obtain a plurality of tone median values of the first pixel; and obtaining the target tone mapping value based on the plurality of tone median values.

* * * * *